United States Patent
Petkov et al.

(10) Patent No.: US 10,331,612 B1
(45) Date of Patent: Jun. 25, 2019

(54) METHODS AND APPARATUS FOR REDUCED-LATENCY DATA TRANSMISSION WITH AN INTER-PROCESSOR COMMUNICATION LINK BETWEEN INDEPENDENTLY OPERABLE PROCESSORS

(71) Applicant: Apple Inc., Cupertino, CA (US)

(72) Inventors: Vladislav Petkov, Cupertino, CA (US); Saurabh Garg, San Jose, CA (US); Karan Sanghi, San Jose, CA (US); Haining Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/865,638

(22) Filed: Jan. 9, 2018

(51) Int. Cl.
*G06F 15/17* (2006.01)
*G06F 13/42* (2006.01)
*H04W 4/80* (2018.01)

(52) U.S. Cl.
CPC .......... *G06F 15/17* (2013.01); *G06F 13/4221* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 4,805,137 A | 2/1989 | Grant et al. | |
| 5,367,688 A | 11/1994 | Croll | |
| 5,467,459 A | 11/1995 | Alexander et al. | |
| 5,485,578 A | 1/1996 | Sweazey | |
| 5,613,086 A | 3/1997 | Frey et al. | |

(Continued)

FOREIGN PATENT DOCUMENTS

| EP | 3013008 A1 | 4/2016 |
|---|---|---|
| JP | 2004086792 A | 3/2004 |

(Continued)

OTHER PUBLICATIONS

ECN L1 PM Substates with CLKREQ approved Aug. 23, 2012.

(Continued)

*Primary Examiner* — Michael Sun
(74) *Attorney, Agent, or Firm* — Gazdzinski & Associates, PC

(57) ABSTRACT

Methods and apparatus for data transmissions over an inter-processor communication (IPC) link between two (or more) independently operable processors. In one embodiment, the IPC link is configured to enable an independently operable processor to transact data to another independently operable processor, while obviating transactions (such as via direct memory access) by encapsulating a payload within a data structure. For example, a host processor may insert the payload into a transfer descriptor (TD), and transmit the TD to a peripheral processor. The host processor may also include a head index and/or a tail index within a doorbell message sent to the peripheral processor, obviating another access of memory. The peripheral processor may perform similar types of transactions via a completion descriptor (CD) sent to the host processor. In some variants, the peripheral may be a Bluetooth-enabled device optimized for low-latency, low-power, and/or low-throughput transactions.

20 Claims, 13 Drawing Sheets

(56) References Cited

U.S. PATENT DOCUMENTS

| | | | |
|---|---|---|---|
| 5,659,542 A | 8/1997 | Bell et al. | |
| 5,708,779 A | 1/1998 | Graziano et al. | |
| 5,731,973 A | 3/1998 | Takaishi et al. | |
| 5,850,395 A | 12/1998 | Hauser et al. | |
| 5,903,564 A | 5/1999 | Ganmukhi et al. | |
| 5,943,507 A | 8/1999 | Cornish et al. | |
| 6,233,702 B1 | 5/2001 | Horst et al. | |
| 6,359,863 B1 | 3/2002 | Varma et al. | |
| 6,411,997 B1 | 6/2002 | Dawes et al. | |
| 6,523,073 B1 | 2/2003 | Kammer et al. | |
| 6,553,446 B1 | 4/2003 | Miller | |
| 6,693,895 B1 | 2/2004 | Crummey et al. | |
| 6,948,094 B2 | 9/2005 | Schultz et al. | |
| 7,100,020 B1 | 8/2006 | Brightman et al. | |
| 7,127,600 B2 | 10/2006 | Zimmer et al. | |
| 7,191,240 B1* | 3/2007 | Johnson | H04L 69/32 709/203 |
| 7,281,172 B2 | 10/2007 | Chujo | |
| 7,397,774 B1 | 7/2008 | Holland et al. | |
| 7,398,382 B2 | 7/2008 | Rothman et al. | |
| 7,509,391 B1 | 3/2009 | Chauvel et al. | |
| 7,681,012 B2 | 3/2010 | Verm et al. | |
| 7,685,476 B2 | 3/2010 | Andre et al. | |
| 7,853,731 B1 | 12/2010 | Zeng | |
| 7,899,941 B2 | 3/2011 | Hendry et al. | |
| 7,941,682 B2 | 5/2011 | Adams | |
| 8,255,725 B2 | 8/2012 | Shimazaki et al. | |
| 8,352,624 B2 | 1/2013 | Zimmerman et al. | |
| 8,468,285 B2 | 6/2013 | Kobayashi | |
| 8,635,412 B1 | 1/2014 | Wilshire | |
| 8,656,228 B2 | 2/2014 | Check et al. | |
| 8,788,822 B1 | 7/2014 | Riddle | |
| 8,799,537 B1 | 8/2014 | Zhu et al. | |
| 8,808,091 B2* | 8/2014 | Shaw | A63F 13/87 463/40 |
| 8,819,386 B1 | 8/2014 | Mather | |
| 8,832,331 B2* | 9/2014 | Co | H04L 12/4633 710/30 |
| 8,848,809 B2 | 9/2014 | Whitby-Strevens | |
| 9,170,957 B2 | 10/2015 | Touzni et al. | |
| 9,280,360 B2 | 3/2016 | Xu | |
| 9,319,090 B2 | 4/2016 | Whitby-Strevens | |
| 9,544,069 B2 | 1/2017 | Whitby-Strevens et al. | |
| 9,547,535 B1 | 1/2017 | Wilt | |
| 9,830,289 B2 | 11/2017 | Pulyala et al. | |
| 9,910,475 B2 | 3/2018 | Kurts et al. | |
| 9,913,305 B2 | 3/2018 | Pinheiro et al. | |
| 2002/0013868 A1 | 1/2002 | West | |
| 2002/0044553 A1 | 4/2002 | Chakravorty | |
| 2002/0065867 A1 | 5/2002 | Chauvel | |
| 2002/0169938 A1 | 11/2002 | Scott et al. | |
| 2003/0014607 A1 | 1/2003 | Slavin et al. | |
| 2003/0086122 A1 | 5/2003 | Parry | |
| 2003/0200413 A1 | 10/2003 | Gurumoorthy et al. | |
| 2004/0044929 A1 | 3/2004 | Chujo | |
| 2004/0064589 A1* | 4/2004 | Boucher | H04L 69/16 709/250 |
| 2004/0128568 A1 | 7/2004 | O'Shea | |
| 2004/0201749 A1 | 10/2004 | Malloy | |
| 2004/0221056 A1 | 11/2004 | Kobayashi | |
| 2004/0228365 A1 | 11/2004 | Kobayashi | |
| 2005/0076196 A1 | 4/2005 | Zimmer et al. | |
| 2005/0108385 A1 | 5/2005 | Wechter et al. | |
| 2005/0114620 A1 | 5/2005 | Justen | |
| 2005/0117601 A1 | 6/2005 | Anderson et al. | |
| 2005/0149711 A1 | 7/2005 | Zimmer et al. | |
| 2005/0157781 A1 | 7/2005 | Ho et al. | |
| 2005/0285862 A1 | 12/2005 | Noda et al. | |
| 2006/0107071 A1 | 5/2006 | Girish et al. | |
| 2006/0218301 A1 | 9/2006 | O'Toole et al. | |
| 2007/0005869 A1 | 1/2007 | Balraj et al. | |
| 2007/0043901 A1 | 2/2007 | Wu et al. | |
| 2007/0070997 A1 | 3/2007 | Weitz et al. | |
| 2007/0180041 A1 | 8/2007 | Suzuoki | |
| 2007/0201492 A1 | 8/2007 | Kobayashi | |
| 2007/0226417 A1 | 9/2007 | Davis | |
| 2007/0286246 A1 | 12/2007 | Kobayashi | |
| 2008/0010563 A1 | 1/2008 | Nishimura | |
| 2008/0046689 A1 | 2/2008 | Chen et al. | |
| 2008/0077816 A1 | 3/2008 | Ravichandran | |
| 2008/0183931 A1 | 7/2008 | Verm et al. | |
| 2008/0231711 A1 | 9/2008 | Glen et al. | |
| 2008/0235355 A1 | 9/2008 | Spanier et al. | |
| 2008/0244259 A1 | 10/2008 | Zimmer et al. | |
| 2008/0301148 A1 | 12/2008 | Lee et al. | |
| 2009/0024924 A1 | 1/2009 | Kim | |
| 2009/0113141 A1 | 4/2009 | Bullman et al. | |
| 2009/0138650 A1 | 5/2009 | Lin et al. | |
| 2009/0177847 A1 | 7/2009 | Ceze et al. | |
| 2009/0189442 A1 | 7/2009 | Chi | |
| 2010/0017655 A1 | 1/2010 | Gooding et al. | |
| 2010/0030932 A1 | 2/2010 | Ergas | |
| 2010/0082859 A1 | 4/2010 | Hendry et al. | |
| 2010/0098419 A1 | 4/2010 | Levy et al. | |
| 2010/0329319 A1 | 12/2010 | Dai et al. | |
| 2011/0029696 A1 | 2/2011 | Uehara | |
| 2011/0052142 A1 | 3/2011 | Sultenfuss et al. | |
| 2011/0219208 A1 | 9/2011 | Asaad et al. | |
| 2011/0242425 A1 | 10/2011 | Zeng | |
| 2011/0276710 A1 | 11/2011 | Mighani et al. | |
| 2011/0310296 A1 | 12/2011 | Lee et al. | |
| 2011/0320861 A1 | 12/2011 | Bayer et al. | |
| 2012/0017063 A1 | 1/2012 | Hummel et al. | |
| 2012/0084483 A1 | 4/2012 | Sanjive | |
| 2012/0084484 A1 | 4/2012 | Post et al. | |
| 2012/0102307 A1 | 4/2012 | Wong | |
| 2012/0159513 A1* | 6/2012 | Pakhunov | G06F 9/52 719/314 |
| 2012/0224640 A1 | 9/2012 | Sole et al. | |
| 2012/0229076 A1 | 9/2012 | Zhu et al. | |
| 2013/0050216 A1 | 2/2013 | Whitby-Strevens et al. | |
| 2013/0057567 A1 | 3/2013 | Frank et al. | |
| 2013/0138840 A1 | 5/2013 | Kegel et al. | |
| 2013/0162911 A1 | 6/2013 | Glen | |
| 2013/0290947 A1 | 10/2013 | Li | |
| 2014/0033220 A1 | 1/2014 | Campbell et al. | |
| 2014/0122828 A1 | 5/2014 | Kagan et al. | |
| 2014/0173236 A1 | 6/2014 | Kegel | |
| 2014/0244866 A1* | 8/2014 | Manula | G06F 13/28 710/27 |
| 2014/0247983 A1 | 9/2014 | MacInnis et al. | |
| 2015/0036051 A1 | 2/2015 | Broberg et al. | |
| 2015/0189109 A1 | 7/2015 | Whitby-Strevens et al. | |
| 2015/0205749 A1 | 7/2015 | Whitby-Strevens et al. | |
| 2015/0212806 A1 | 7/2015 | Hsieh | |
| 2015/0309940 A1 | 10/2015 | Kumar et al. | |
| 2015/0378737 A1 | 12/2015 | Debbage et al. | |
| 2016/0034195 A1 | 2/2016 | Li et al. | |
| 2016/0041852 A1 | 2/2016 | Suarez et al. | |
| 2016/0077989 A1 | 3/2016 | Pulyala et al. | |
| 2016/0103480 A1 | 4/2016 | Sanghi et al. | |
| 2016/0103689 A1 | 4/2016 | Sanghi et al. | |
| 2016/0103743 A1 | 4/2016 | Sanghi et al. | |
| 2016/0224442 A1 | 8/2016 | Sanghi et al. | |
| 2016/0269991 A1 | 9/2016 | Van et al. | |
| 2016/0299860 A1* | 10/2016 | Harriman | G06F 13/36 |
| 2016/0364350 A1 | 12/2016 | Sanghi et al. | |
| 2017/0108912 A1 | 4/2017 | Li et al. | |
| 2017/0249098 A1 | 8/2017 | Petkov et al. | |
| 2017/0286300 A1 | 10/2017 | Doshi et al. | |
| 2017/0286322 A1 | 10/2017 | Garg et al. | |
| 2017/0286323 A1 | 10/2017 | Garg et al. | |

FOREIGN PATENT DOCUMENTS

| | | |
|---|---|---|
| JP | 2013246642 A | 12/2013 |
| WO | WO-2008070138 A2 | 6/2008 |

OTHER PUBLICATIONS

Jackson, Budruk: "PCI Express Technology", Sep. 2012 (Sep. 2012), MindShare Press, XP002777351, pp. 49,86,87,712-723.

(56) References Cited

OTHER PUBLICATIONS

PCI Express base Specification Revision 3.0, published Nov. 10, 2010.
PCI Express Base Specification Revision 3.1, published Oct. 8, 2014.
Universal Serial Bus, Communication Class, Subclass Specifications for Network Control Model (NCM) Devices; Revision 1.0 (Errata 1), Nov. 24, 2010, published by Usb Implementers Forum, Inc.

* cited by examiner

| Interface | Direction | TR ID | Completion Ring ID | Relevant features |
|---|---|---|---|---|
| Command (HCI commands and events) | Host -> Peripheral | 1 | 1 | • In-order completion on CR<br>• Doorbell conveys index<br>• Payload in TD footer |
| | Peripheral -> Host | 2 | 2 | • In-order completion on CR<br>• Virtual TR<br>• Doorbell conveys index<br>• Payload in TD footer<br>• Accumulation |
| Synchronous (SCO, eSCO) | Host -> Peripheral | 3 | 3 | • In-order completion on CR<br>• Payload in TD footer |
| | Peripheral -> Host | 4 | 4 | • In-order completion on CR<br>• Virtual TR<br>• Payload in CD footer |
| ACL | Host -> Peripheral | 5 | 1 | • In-order completion on CR<br>• Doorbell conveys index<br>• Doorbell moderation<br>• Payload in TD footer if it fits |
| | Peripheral -> Host | 6 | 2 | • In-order completion on CR<br>• Doorbell conveys index<br>• Payload in CD footer if it fits<br>• Accumulation |
| Debug | Host -> Peripheral | | | |
| | Peripheral -> Host | 8 | 5 | • In-order completion on CR<br>• Doorbell conveys index |

FIG. 6

METHODS AND APPARATUS FOR REDUCED-LATENCY DATA TRANSMISSION WITH AN INTER-PROCESSOR COMMUNICATION LINK BETWEEN INDEPENDENTLY OPERABLE PROCESSORS

RELATED APPLICATIONS

This application is related to commonly owned U.S. patent application Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS" and filed Oct. 8, 2015; Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS" and filed Oct. 8, 2015; Ser. No. 14/856,283 entitled "METHODS AND APPARATUS FOR AGGREGATING PACKET TRANSFER OVER A VIRTUAL BUS INTERFACE" and filed Sep. 16, 2015; Ser. No. 14/870,923 entitled "METHODS AND APPARATUS FOR CONTROLLED RECOVERY OF ERROR INFORMATION BETWEEN INDEPENDENTLY OPERABLE PROCESSORS" filed Sep. 30, 2015; and commonly owned U.S. Provisional Patent Application Ser. No. 62/175,174 entitled "METHODS AND APPARATUS FOR SYNCHRONIZING UPLINK AND DOWNLINK TRANSACTIONS ON AN INTER-PROCESSOR COMMUNICATION LINK" and filed Jun. 12, 2015, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. TECHNICAL FIELD

The disclosure relates generally to the field of electronics devices, as well as networks thereof. More particularly, and in one exemplary aspect, the disclosure is directed to methods and apparatus for implementing an inter-processor communication (IPC) link between two (or more) independently operable processors. Various aspects of the present disclosure are directed to, in one exemplary aspect, transaction of data over the IPC link according to one or more application constraints.

2. DESCRIPTION OF RELATED TECHNOLOGY

Consumer devices and computer systems have grown more sophisticated over time, and have led to architectures that incorporate multiple processing components (e.g., processors). Each of these multiple processors play a distinct role in accomplishing one or more functions of e.g., a consumer device (e.g., smartphone, tablet, laptop, phablet, smartwatch, portable media players, smart home device, intelligent personal assistant). For reasons articulated in greater detail herein, the independent operation of processors is necessary to support the increasing complexity of these processing roles.

Various bus architectures and techniques have evolved over time which are able to handle increasingly faster data rates and provide higher levels of data throughput appropriate for recent implementations. One example of such a bus is the Peripheral Component Interconnect Express ("PCIe"); see, e.g., PCI Express Base Specification Revision 4.0 dated Oct. 5, 2017 ("PCIe Specification"), which is incorporated herein by reference in its entirety. PCIe is a high-speed serial computer expansion bus standard designed to replace older, conventional PCI (Peripheral Component Interconnect) and similar bus standards.

PCIe has historically been used as serial computer expansion bus technology, and has had limited applicability beyond such applications. In terms of architecture, PCIe is based on point-to-point connectivity with separate serial links connecting every endpoint component (e.g., graphics card, memory) to the root complex (e.g., host processor). Typically, PCIe transactions involve the transfer of bulk data, such as large collections of data from one or multiple sources, typically stored or buffered in external memory modules.

Notably, PCIe has many desirable attributes in terms of, inter alia, performance, flexibility, and wide adoption. However, PCIe (as well as some other existing "computer-centric" bus technologies) suffers certain disabilities, especially from the standpoint of portable consumer electronic device implementations. Specifically, extant PCIe technologies were developed for use within desktop, server, and laptop computers, which to varying degrees are agnostic to many electrical power, memory, and/or data size considerations affecting peripheral devices or smaller portable devices. Desktops and servers (and to a lesser degree laptops) are less concerned with power consumption and conservation, and more concerned with bus performance, the ability to "hot plug" (i.e., adding a component to a running computer system), and the like.

PCIe was contemplated for, and best suited to, high-speed bulk data transfers. However, mobile consumer electronics have different considerations. In many such devices, designers must make different design trade-offs for e.g., speed, latency, power consumption, and the size of data transfers. One such exemplary usage scenario is the transaction of data for Bluetooth applications. Bluetooth applications commonly require e.g., low latency, fast response times, small packet sizes, and low power consumption. See, for example, the Bluetooth Core Specification Version 5.0 dated Dec. 6, 2016 ("Bluetooth Specification"), which is incorporated herein by reference in its entirety.

Accordingly, implementing a technology such as PCIe in its current incarnation, both (i) consumes significant electrical power during operation, and (ii) has limited power management infrastructure. Thus PCIe is generally unsuitable for portable consumer electronics applications (such as Bluetooth) where response times, power consumption, and battery conservation are critical. Additionally, extant PCIe connectivity is unable to accommodate scenarios where the "peripheral" processor is required to operate while the "host" processor is asleep or vice versa. Such operational scenarios and requirements are common with PCIe links implemented in the aforementioned devices.

Hence, there is a need for improved apparatus and associated methods that can leverage the flexible attributes of bus technologies such as PCIe (and other "memory mapped" technologies), yet support the desirable benefits of low latency and power conservation, as well as the ability to support various combinations of operational sleep states or other reduced-power modes by various chipsets within the device (including e.g., wireless modems).

SUMMARY

The present disclosure satisfies the foregoing needs by providing, inter alia, methods and apparatus for transaction of data over an inter-processor communication (IPC) link between two (or more) independently operable processors, according to one or more application constraints.

A method of transferring packets via an inter-processor communication (IPC) link between a first independently operable processor apparatus and a second independently operable processor apparatus is disclosed. In one embodiment, the method includes: identifying a payload for transfer, the payload including one or more packets to be transmitted to the second independently operable processor apparatus; selecting one of a plurality of transmission modes based on a communication protocol of the second independently operable processor apparatus having one or more application constraints, the selected transmission mode to be used for the transfer to the second independently operable processor apparatus; for a first of the plurality of transmission modes, placing the payload in a location of a memory described by a data structure; for a second of the plurality of transmission modes, placing the payload within a designated portion of the data structure; and transmitting the data structure to the second independently operable processor apparatus via the IPC link.

In one variant, the placing of the payload within the designated portion of the data structure includes placing the payload in a footer component or a header component of a transfer descriptor, the transfer descriptor representing an input/output (I/O) access. In one such variant, the placing the payload in the location of the memory described by the data structure includes placing the payload in a memory buffer location identified by the transfer descriptor.

In another variant, the selecting one of the plurality of transmission modes based on the communication protocol is based on a Bluetooth protocol or Bluetooth Low Energy (BTLE) protocol. In one such variant, the selecting is further based on the one or more application constraints of power, data latency, or data throughput.

In yet another variant, the transmitting of the data structure to the second independently operable processor apparatus does not require access to a memory that is external to the second independently operable processor apparatus.

In yet another variant, the selecting one of a plurality of transmission modes is based on one or more application constraints of a Host-Control Interface (HCI), an Asynchronous Connection-Less (ACL) interface, and a Synchronous Connection-Oriented (SCO) interface.

A device configured to enable data communication between a first and a second processor apparatus via an inter-processor communication (IPC) link is disclosed. In one embodiment, the device includes: a first bus configured to transmit data between the first and second processor apparatus; and a non-transitory computer-readable apparatus including a storage medium having a computer program therein.

In one exemplary embodiment, the computer program includes a plurality of instructions that are configured to, when executed by the first processor apparatus, cause the first processor apparatus to: identify a payload for transmission to the second processor apparatus; determine a communication protocol to be used by the second processor apparatus; determine whether a size of the payload exceeds a threshold; when the size of the payload exceeds the threshold, place the payload within an external memory module, and cause retrieval of the payload from the external memory module by the second processor apparatus; and when the size of the payload does not exceed the threshold, place the payload within a region of a data structure and transmit the data structure directly to the second processor apparatus via the first bus.

In one variant, the device includes a wireless-enabled device; the first processor apparatus includes an application processor (AP); the second processor apparatus includes a baseband (BB) processor, the BB processor being in data communication with a peripheral device; and the second processor apparatus is in data communication with an air interface associated with the peripheral device.

In another variant, the data structure includes a transfer descriptor; and the plurality of instructions are further configured to, when executed by the first processor apparatus, cause the first processor apparatus to: cause the second processor apparatus to receive a payload via the transmission of the transfer descriptor, the payload being contained in the region of the transfer descriptor, the region of the transfer descriptor including a footer component or a header component of the transfer descriptor; and receive a second data structure from the second processor apparatus, the second data structure including a completion descriptor, the completion descriptor being configured to indicate completion of the transmission of the transfer descriptor.

In yet another variant, the transmission of the data structure is configured to enable the communication protocol to transact a Host-Control Interface (HCI), an Asynchronous Connection-Less (ACL) interface, or a Synchronous Connection-Oriented (SCO) transaction.

In yet another variant, a size of the payload is at most 280 bytes.

In yet another variant, the communication protocol to be used by the second processor apparatus is characterized by one or more application constraints.

In yet another variant, the device further includes a second bus; and the first and second bus include a pair of unidirectional pipes, a first of the pair of unidirectional pipes being configured to transmit a first data from the first to the second processor apparatus, the second of the pair of unidirectional pipes being configured to transmit a second data from the second to the first processor apparatus.

In yet another variant, the communication protocol includes Bluetooth or Bluetooth Low Energy (BTLE).

A non-transitory computer-readable apparatus is disclosed. In one exemplary embodiment, the non-transitory computer-readable apparatus includes a storage medium having a computer program therein, the computer program including a plurality of instructions configured to, when executed by an independently operable processor apparatus, cause the processor apparatus to: identify a communication protocol to be used by the other processor apparatus; determine a payload for transmission to another independently operable processor apparatus, the processor apparatus and the other processor apparatus being in data communication via an inter-processor communication (IPC) link; place the payload inside a component of a data descriptor, the data descriptor describing a physically contiguous memory buffer associated with the processor apparatus; and transmit a doorbell message to the other processor apparatus, the doorbell message including an index of data structures, at least one of the data structures including the data descriptor;

transact the data descriptor to the other processor apparatus, causing the other processor apparatus to receive the payload; and receive a second data descriptor indicating that the other processor apparatus has completed the transaction of the data descriptor.

In one variant, the processor apparatus includes an applications processor (AP); the other processor apparatus includes a baseband processor (BB); the BB is configured to be in data communication with an air interface associated with a modem configured to be in data communication with a peripheral device; the received payload is used by the modem to perform a data transaction with the peripheral device.

In another variant, the data structure includes a transfer descriptor ring.

In yet another variant, the other processor apparatus operates via a Bluetooth protocol; and the plurality of instructions are further configured to, when executed by the processor apparatus, cause the processor apparatus to: generate an Asynchronous Connection-Less (ACL) payload for the other processor; determine whether a size of the ACL payload exceeds a threshold; when the size of the ACL payload exceeds the threshold, place the ACL payload within an external memory module, and cause retrieval of the ACL payload from the external memory module by the other processor apparatus; and when the size of the ACL payload does not exceed the threshold, place the ACL payload within the component of the data descriptor, and transmit the data structure directly to the other processor apparatus.

In yet another variant, the other processor apparatus operates via a Bluetooth protocol; and the plurality of instructions are further configured to, when executed by the processor apparatus, cause the processor apparatus to generate an Synchronous Connection Oriented (SCO) payload for the other processor.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 6 illustrates a table summarizing the interfaces described within FIGS. 4 and 4A-4D.

Figure 1:
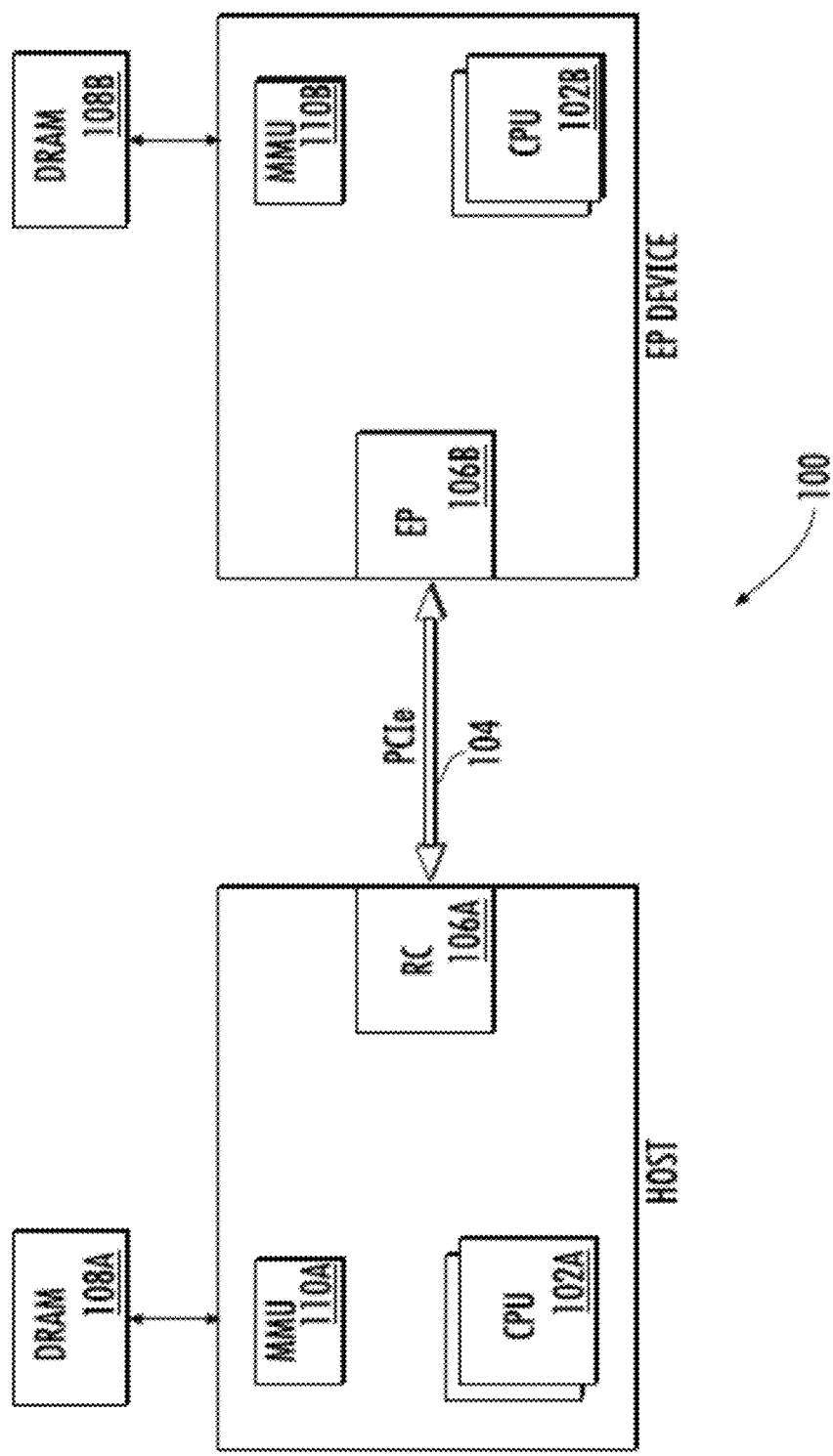
FIG. 1 illustrates an exemplary apparatus useful for illustrating various principles described herein.

All figures © Copyright 2017-2018 Apple Inc. All rights reserved.

DETAILED DESCRIPTION

Reference is now made to the drawings, wherein like numerals refer to like parts throughout.

DETAILED DESCRIPTION OF EXEMPLARY EMBODIMENTS

Exemplary embodiments of the present disclosure are now described in detail. While these embodiments are primarily discussed in the context of an inter-processor communication (IPC) link (for example, of the type described within commonly owned and co-pending U.S. patent application Ser. No. 14/856,283 entitled "METHODS AND APPARATUS FOR AGGREGATING PACKET TRANSFER OVER A VIRTUAL BUS INTERFACE" and filed Sep. 16, 2015, previously incorporated by reference in its entirety), it will be recognized by those of ordinary skill that the present disclosure is not so limited. In fact, the various aspects of the disclosure are useful in any device or network of devices that is configured to incorporate and coordinate multiple independently operable processing elements, as is disclosed herein.

Various embodiments described herein may be used in conjunction with power management schemes such as those described within commonly owned and co-pending U.S. patent application Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS" and filed Oct. 8, 2015, previously incorporated by reference in its entirety.

Moreover, while exemplary implementations are primarily described in the context of the inter-processor communication links (e.g., via a PCIe protocol) and low-throughput wireless communication protocols (e.g., Bluetooth, Bluetooth Low Energy), those of ordinary skill in the related arts will readily appreciate that such descriptions are purely illustrative, and it will be appreciated that the various features and techniques described herein can be applied to other bus protocols and wireless protocols.

Exemplary Inter-Processor Communications Link

As previously noted, bus techniques have evolved which are able to handle faster data rates and provide higher levels of data throughput. One such example bus technique is referred to as a so-called Peripheral Component Interconnect Express (PCIe) bus. PCIe has historically been used as a high-speed serial computer expansion bus technology; PCIe is based on point-to-point connectivity with separate serial links connecting every endpoint component (e.g., graphics card, memory, etc.) to the root complex (e.g., host processor). However, existing PCIe technologies consume significant power and are unsuitable for relatively low-power and low-latency communication protocols used in consumer electronics applications, for example, Bluetooth. Current PCIe bus protocols perform operations involving data transactions that are more appropriate for bulk, high-throughput data communication between a "peripheral" processor and the "host" processor.

Within this context, exemplary methods and apparatus are now described which support an inter-processor communication (IPC) link between two (or more) independently operable processors. The following discussions will be described in reference to a "root complex" (RC) (or "host") processor, and an "endpoint" (EP) (or "peripheral") processor. For reasons which will become apparent below, it is appreciated that the designation as to host or peripheral processor is used to simplify and/or clarify the following explanations, and does not imply existing host or peripheral functionality, or that such roles cannot be reversed. Moreover, those of ordinary skill in the related arts will readily appreciate that the various principles described herein, may broadly apply to any network of two (or more) independently operable processors.

As used herein, the term "independently operable processor" refers to a processing system having one or more of the processor clock domain, processor power domain, processor code base, arithmetic units, registers, and/or memory, capable of being isolated to allow the processor to operate without other processors in the processing system. In one exemplary embodiment, an independently operable processor can transition into various power-conserving modes independent of the power-conserving modes of other ones of the plurality of sub-systems. In another embodiment, an independently operable processor can adjust its clock frequency, phase, and/or amplitudes, independent of the power-conserving modes of other ones of the plurality of sub-systems. In still another embodiment, an independently operable processor can reboot and/or update its firmware or software independent of the software execution of other ones of the plurality of sub-systems.

As used herein, a "processor" refers generally to any logic or circuitry that responds to and processes computer-readable instructions that are stored within, for example, a non-transitory computer-readable medium, e.g., a memory.

As used herein, a "baseband processor" is a processor that is configured to communicate with a wireless network. Common examples of wireless networks include, without limitation, Long Term Evolution/Advanced (LTE and LTE-A) technology, IEEE-Std. 802.11 (any variants thereof), PAN technology such as e.g., Bluetooth or IEEE Std. 802.15.4, "ZigBee", near field communication/RFID, WiMAX (IEEE 802.16), WMANs, 3G cellular (e.g., WCDMA, 3GPP, 3GPP2, and GSM and improvements thereon, and ISM band networks.)

In one aspect, the IPC protocol may be based on a "shared" memory interface for run-time processing (i.e., the independently operable processors each share, either virtually or physically, a common memory interface). In one such embodiment, the shared memory interface provides a multi-channel IPC link for high throughput transfers. In one exemplary implementation, the shared memory interface remains functional when any one of the independently operable processors is active, even when one or more of the remaining independently operable processors are asleep, powered down, powered off, etc.

As used herein, the term "logical" or "virtual" are interchangeably used to refer to, without limitation, an abstraction (typically performed in software or machine logic) to represent physical mechanisms, attributes or functionalities as a data structure. For example, as used herein a "logical bus interface", "virtual bus interface", etc. refers generally to an abstraction or representation of a bus interface as a series of data structures. In contrast, as used herein a "physical bus interface" refers to the physical mechanisms, attributes or functionalities of a physically tangible bus interface.

As used herein, the term "in-band" refers without limitation to data transactions which are transacted within a primary logical or physical interface, and which affect the mechanisms, attributes or functionalities of the primary logical or physical interface. In contrast, the term "out-of-band" refers to data transactions which are not transacted within the primary logical or physical interface, and which affect the mechanisms, attributes or functionalities of the primary logical or physical interface.

FIG. 1 illustrates exemplary apparatus 100 useful for illustrating various principles described herein. As shown, the apparatus 100 includes a first and second independently operable processor (102A, 102B), and a physical bus interface 104 that is configured to implement an inter-processor communication (IPC) link between the two (or more) independently operable processors.

In one exemplary embodiment, the first and second processor are connected via a bus interface. As used herein, the term "bus interface" refers to any communication system that transfers data between processors and/or peripheral components. A bus interface may include, in part or whole, hardware components (wiring, optical fiber, and other transmission mediums) and/or associated software (including communication protocols and hardware drivers.)

As used herein, an "inter-processor communication link" or "IPC link" refers to any communication bus between two (or more) processors, whether the processors are operating independently, not independently, or a combination thereof. An IPC link may include one or more data pipes that are configured to transfer data from one processor to another, for example, between a host side (e.g., root complex) and peripheral side (e.g., endpoint) of the link. A given data pipe of an IPC link may be configured to transfer the data in a unidirectional or bidirectional fashion.

As used herein, "unidirectional" relates to transmission or reception of data (e.g., instructions, packets, signals) in one direction such that the data is only configured to be transferred from a given computing entity (e.g., logic, circuitry, processor) to another computing entity, but not in the other direction (i.e., from the other computing entity back to the given computing entity).

On the other hand, "bidirectional" or "multidirectional" relates to transaction of data (e.g., instructions, packets, signals) in two or more directions such that the data may be configured to be transferred between a given computing entity (e.g., logic, circuitry, processor) to another computing entity (and vice versa).

In one implementation, the first processor 102A includes an applications processor (AP). As shown in FIG. 1, the first processor 102A is coupled to a Root Complex (RC) 106A which functions as the host of the IPC bus.

In one implementation, the second processor 102B includes a wireless modem. In one exemplary embodiment, the second processor 102B includes a Bluetooth modem. Other common examples of wireless modems include, without limitation devices implementing e.g., IEEE Std. 802.11 (any variants thereof, including Wi-Fi and wireless local area network (WLAN)), PAN technology such as e.g., Bluetooth or IEEE Std. 802.15.4, "ZigBee", near field communication/RFID, WiMAX (IEEE 802.16), WMANs, 3G cellular (e.g., Long Term Evolution/Advanced (LTE and LTE-A), WCDMA, 3GPP, 3GPP2, and GSM and improvements thereon), and ISM band devices.

In other embodiments, the second processor 102B may be e.g., a media processor, or other network processing element.

As shown in FIG. 1, the second processor 102B is coupled to an Endpoint (EP) 106B which functions as the peripheral of the IPC link.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. In some cases, the first and/or second processors may have an associated non-volatile memory (e.g., a flash memory) which is configured to store computer readable instructions, and retain the stored computer readable instructions without power.

As used herein, the term "buffer" refers to a device, circuit, logic, or an area of a computing environment that is used to store data temporarily, typically stored thereon until instructions are given or received to move the stored data to another entity (e.g., processor, memory, another buffer). The term "buffer" may be interchangeable with similar terms such as "queue" or "memory" or "local memory" depending on the context. In one embodiment, a buffer may be a type of memory. Examples of types of buffers may include, circular or ring buffer, FIFO (first in, first out), LIFO (latest in, first out), round robin, shortest job first, shortest remaining time, dynamic array. Persons of ordinary skill in the relevant art will recognize various other structures and operations related to buffering and temporary data storage.

As shown, both the first and the second processors (102A, 102B) are each coupled to a non-transitory computer readable medium (e.g., dynamic random access memory (DRAM)) (108A, 108B) and a memory management unit (MMU) (110A, 110B). The non-transitory computer readable medium is configured to store computer readable instructions for execution.

Figure 2:
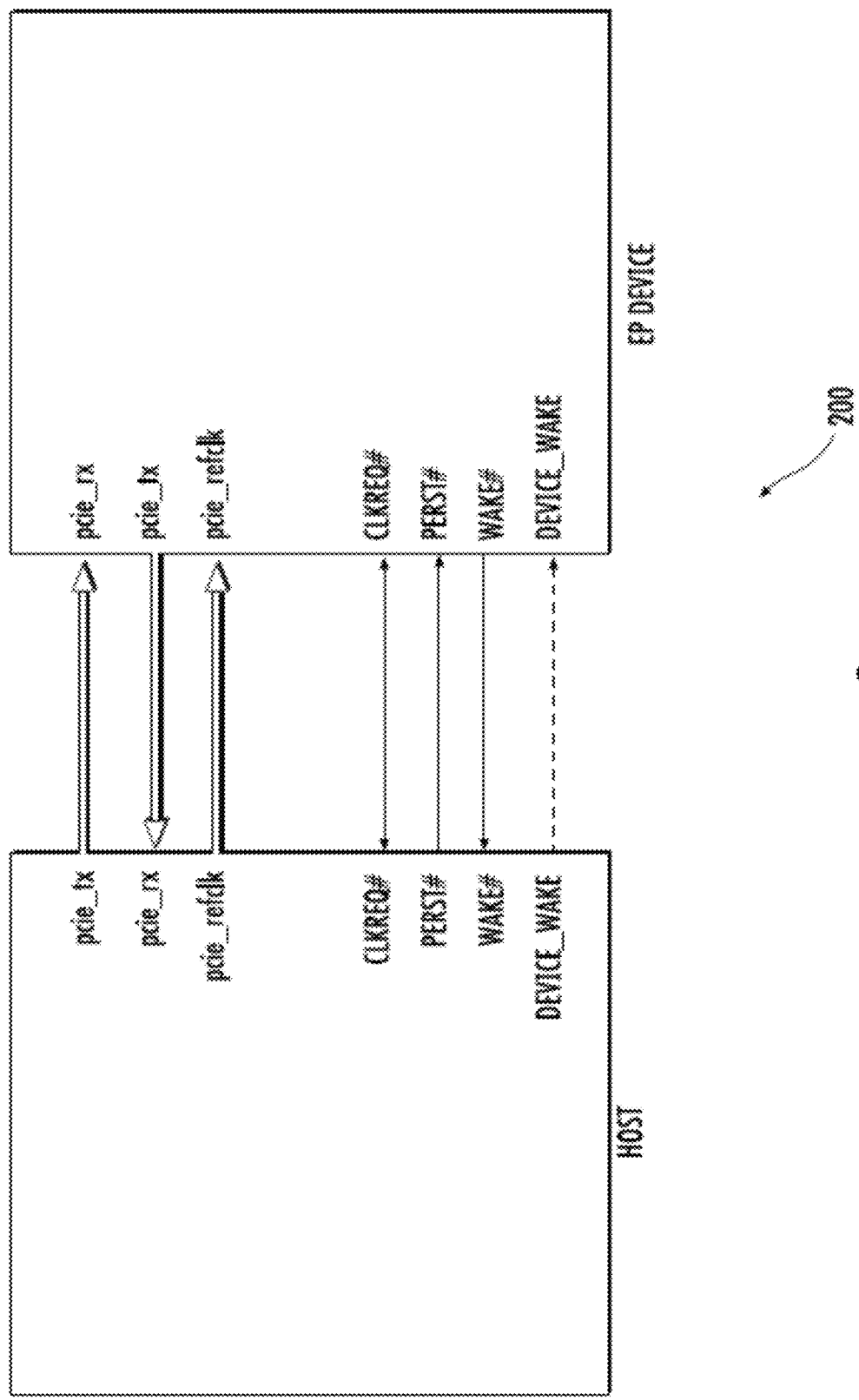
FIG. 2 illustrates an exemplary inter-processor communications link, useful for illustrating various principles described herein.

As shown in FIG. 2, the physical bus interface 104 may be loosely based on the Peripheral Component Interconnect Express (PCIe) standard (e.g., the aforementioned PCI Express Base Specification Revision 4.0 dated Oct. 5, 2017, previously incorporated by reference in its entirety). Those of ordinary skill in the related arts, given the contents of the present disclosure, will readily appreciate that other bus interface standards may be substituted with equal success. Various modifications to the underlying physical bus interface 104 (and protocols used therewith) to support IPC functionality within the context of e.g., Bluetooth operation are described in greater detail hereinafter.

In the exemplary embodiment, the physical bus interface 104 may be a point-to-point communication channel between two IPC ports (the RC and EP) allowing both to send/receive access requests (configuration read/write, I/O read/write, memory read/write) and interrupts. At the physical level, a link is composed of one or more lanes (one shown in FIG. 2), each lane having receive and transmit component (e.g., pcie_rx and pci_tx). Each lane is a full-duplex byte stream, transporting data packets in eight-bit 'byte' formats, between the RC and EP of a link, in both directions simultaneously. The physical bus interface 104 may support multiple logical links (or virtual bus interfaces) representing multiple ongoing data sessions.

In one such embodiment, each virtual bus interface may further include one or more "sessions" which are a persistent and/or semi-persistent set of data transactions (e.g., datagrams) between two logical endpoints. In some embodiments, the session may include "stateful" transactions (i.e., the data transactions are based on a current state of the session), and/or "stateless" transactions (i.e., the data transactions are not based on a current state of the session).

Bulk Data Transactions—

Figure 3A:
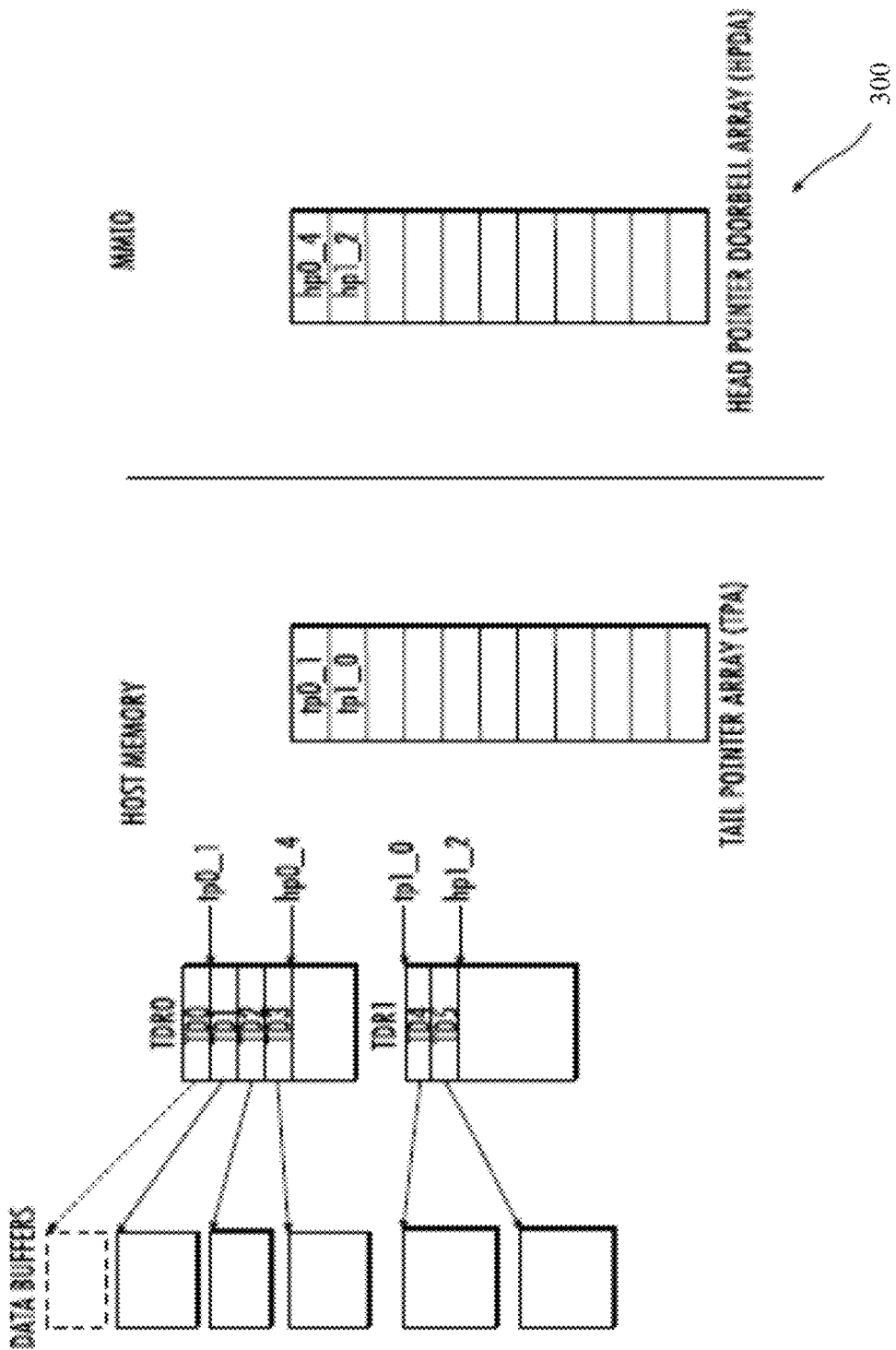
FIG. 3A illustrates exemplary data structures used during inter-processor communication (IPC) link operation.

FIG. 3A illustrates exemplary data structures 300 used during inter-processor communication (IPC) link operation.

As a brief aside, data transactions (e.g., in input/output (I/O) transactions) associated with one or more data pipes may be composed of at least one "transfer descriptor" (TD) that may be identified within a "transfer descriptor ring" (TDR) described infra. In one embodiment, a single TD may describe a physically contiguous memory buffer, accessible by the host/peripheral processor over the communication link. A TD may include various fields, such as the type of the descriptor, size of the buffer, address of the buffer, tag unique to the buffer described by the TD, remaining count indicating the number of TDs remaining in a packet transfer, a header with information at the beginning of the TD, or a footer and/or a header field containing data such as metadata or data associated with each TD.

Each "pipe" (data stream) may be associated with one "transfer descriptor ring" (TDR), also called "transfer ring" (TR). During, for example, normal bulk transaction mode operation, TDs sit inside a TDR data structure that resides in host processor memory and is accessible by the peripheral processor. Each TDR may be described by a TDR head index (also referred to as a head pointer) and/or a TDR tail index (also referred to as a tail pointer), and encompasses one or more TDs. The head pointer points to the next empty slot in the TDR, whereas the tail pointer points to the address of next TD which the peripheral will process. The head pointer is written by the host and read by the peripheral. The tail pointer is read by the host and written by the peripheral. When the head pointer is equal to the tail pointer, the TDR is empty.

The TD/TDR data structure enables independent queue processing for both the host and peripheral. For example, the peripheral can read from one area of memory described by a first TD while the other host writes to a different area of memory to prepare a different TD. Processing may be performed on a e.g., best-effort, prioritized, round robin, weighted round robin, or any number of other ordering basis. In some cases, TDs may be queued and/or flushed according to ongoing flow control and/or other bandwidth management. Various other schemes for TD processing will be readily appreciated by those of ordinary skill, given the contents of the present disclosure.

As used herein, a "completion descriptor" (CD) is used to inform a processor of a completion event associated with one or more corresponding TDs; for example, a peripheral processor may use a CD to inform a host processor that a previously queued TD has been successfully or unsuccessfully transferred. A CD may include various fields, such as the type of the descriptor, status of the completion, an identifier of the TDR to which the completion corresponds, a tag of the buffer completed, the size of the data transferred, header information at the beginning of the CD, and/or a footer field containing metadata or data associated with the CD.

A "completion descriptor ring" (CDR) or "completion ring" (CR) is a data structure for storing information regarding completion events. CDs are stored within a CDR data structure that resides in host memory and is accessible to the peripheral. Each CD is described by a CDR head index and/or a CDR tail index, and represents completion events for a corresponding transaction.

Referring back to FIG. 3A, the exemplary data structures 300 include a first pipe (TDR0) in the uplink direction (from the host to the peripheral), and a second pipe (TDR1) in the downlink direction (from the peripheral to the host). As shown, the host processor has queued four (4) TDs in TDR0 for uplink transfer and informed the peripheral processor by writing the address (hp0_4) at the TDR0 head pointer offset in the HPDA (0). After the peripheral processor has successfully transmitted the data for TD0, it updates the TPA entry (0) by writing a new tail pointer address (tp0_1). When the peripheral processor updates the appropriate TPA entry, the host can free the corresponding data buffer from memory.

Similarly, as shown, the host has queued two (2) TDs in TDR1 for downlink transfer and informs the peripheral process device by writing hp1_2 at offset 1 in HPDA. Once the peripheral processor consumes these TDs, it will update TPA to inform the host.

In some implementations, the TDs may be "aggregated" into a larger scatter-gather TD to support so-called "scatter-gather" behavior for large I/O transfers (e.g., each procedure-call sequentially writes data from multiple buffers to a single data stream or reads data from a data stream to multiple buffers; the so-called "scatter/gather" refers to the process of gathering data from, or scattering data into, the given set of buffers.)

Figure 3B:
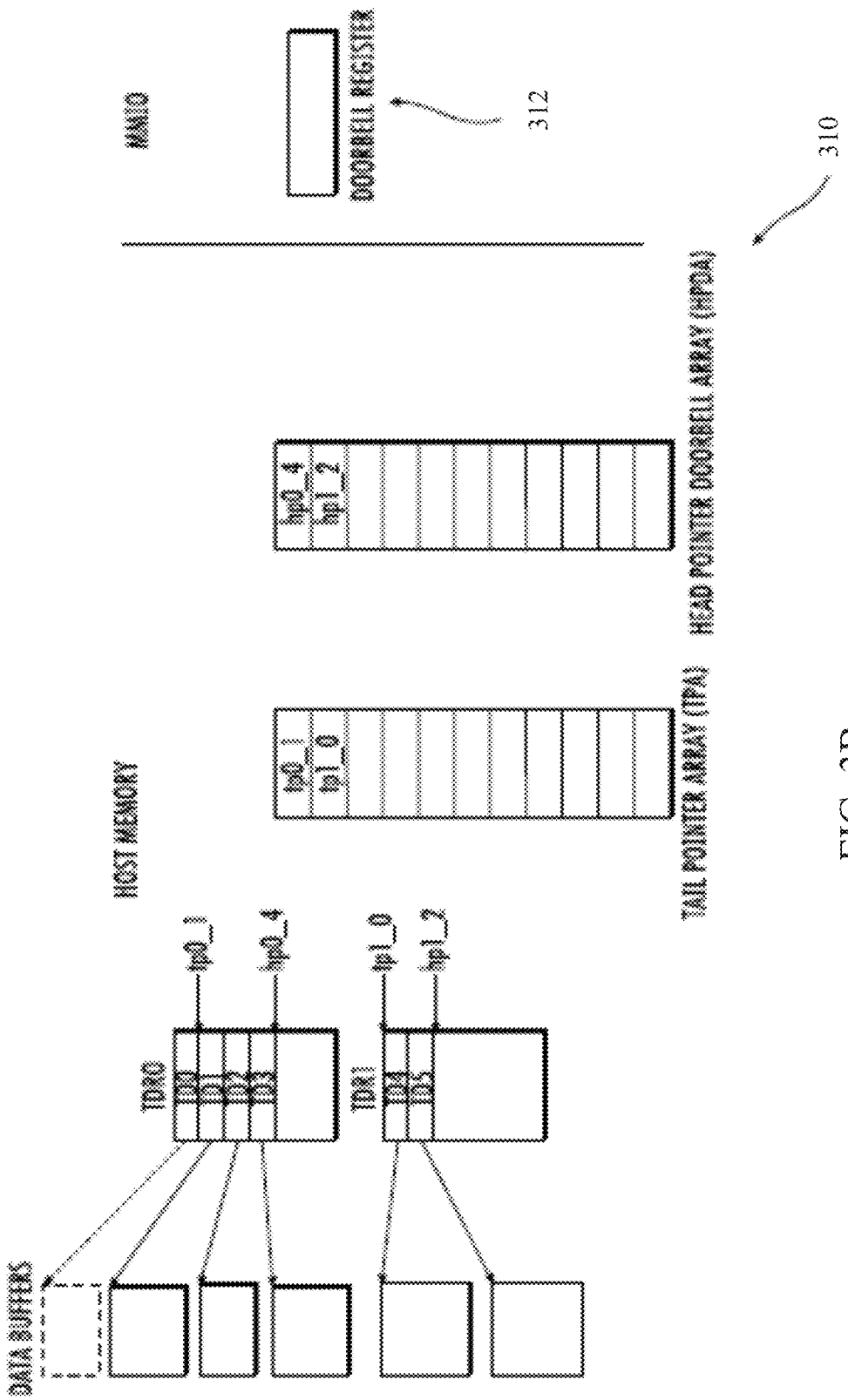
FIG. 3B illustrates other exemplary data structures with a doorbell register, used during inter-processor communication (IPC) link operation.

FIG. 3B illustrates an alternate exemplary data structure 310, with a so-called "doorbell register" 312 disposed in the MMIO, and the doorbell array disposed in the host processor (e.g., AP).

Figure 3C:
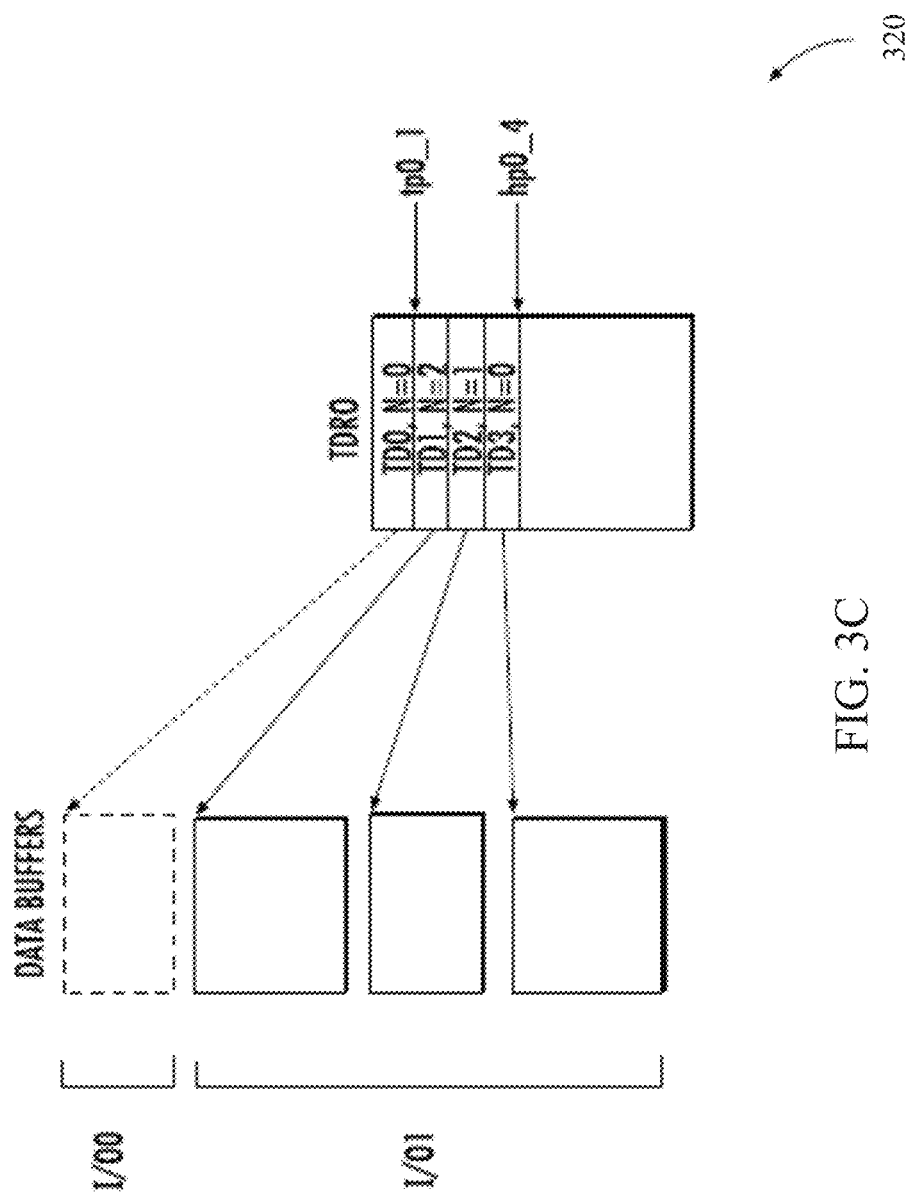
FIG. 3C illustrates one exemplary scatter-gather transfer descriptor.

FIG. 3C illustrates one exemplary scatter-gather TD 320 which is described by three (3) TDs according to an exemplary "scatter-gather" scheme. Each TD indicates the remaining count of TDs in the aggregate scatter-gather TD. For example, as shown, I/O1 includes TD1 which continues to TD2 (two (2) TDs remain e.g., N=2), and TD2 continues to TD3 1 (one (1) TD remains N=1), and TD3 points to TD0 which is the last descriptor in the transfer (N=0, no remaining TDs). Each TD contains a pointer to the data buffer in host memory (indicating the address to be accessed by the peripheral to perform the data transfer) and a size field (indicating the size of the data transfer). For uplink TDRs, the size field is read-only for the peripheral, whereas for downlink TDRs the size field may be read/write for the peripheral. During a downlink transfer, the peripheral reads the size field to determine the maximum size of the buffer available. After the downlink transfer, the peripheral may update the size field with the actual size of data written into the buffer.

Figure 3D:
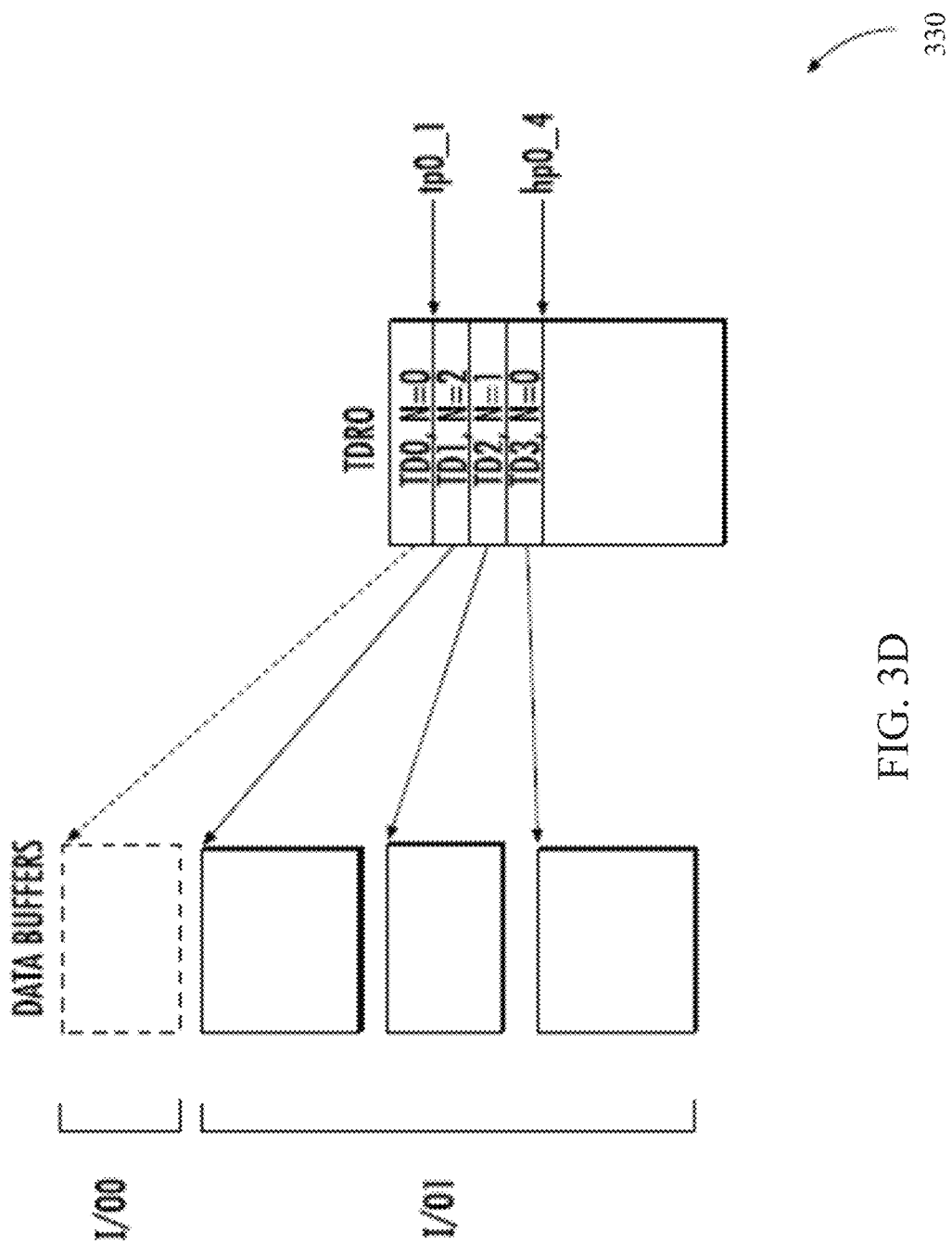
FIG. 3D illustrates an alternate exemplary scatter-gather transfer descriptor.

FIG. 3D illustrates an alternate exemplary scatter-gather TD 330, which is described by three (3) TDs according to an exemplary "scatter-gather" scheme, and which is useful with the data structure 310 of FIG. 3B.

Methods

The following discussion describes methods for transaction of data over an inter-processor communication (IPC) link between two (or more) independently operable processors, according to one or more application constraints. More directly, unlike the foregoing bulk transactions of FIGS. 3A-3D which are used for generic bus transactions, the following discussion is directed to modifications to the transaction modes so as to support various application constraints.

Figure 4:
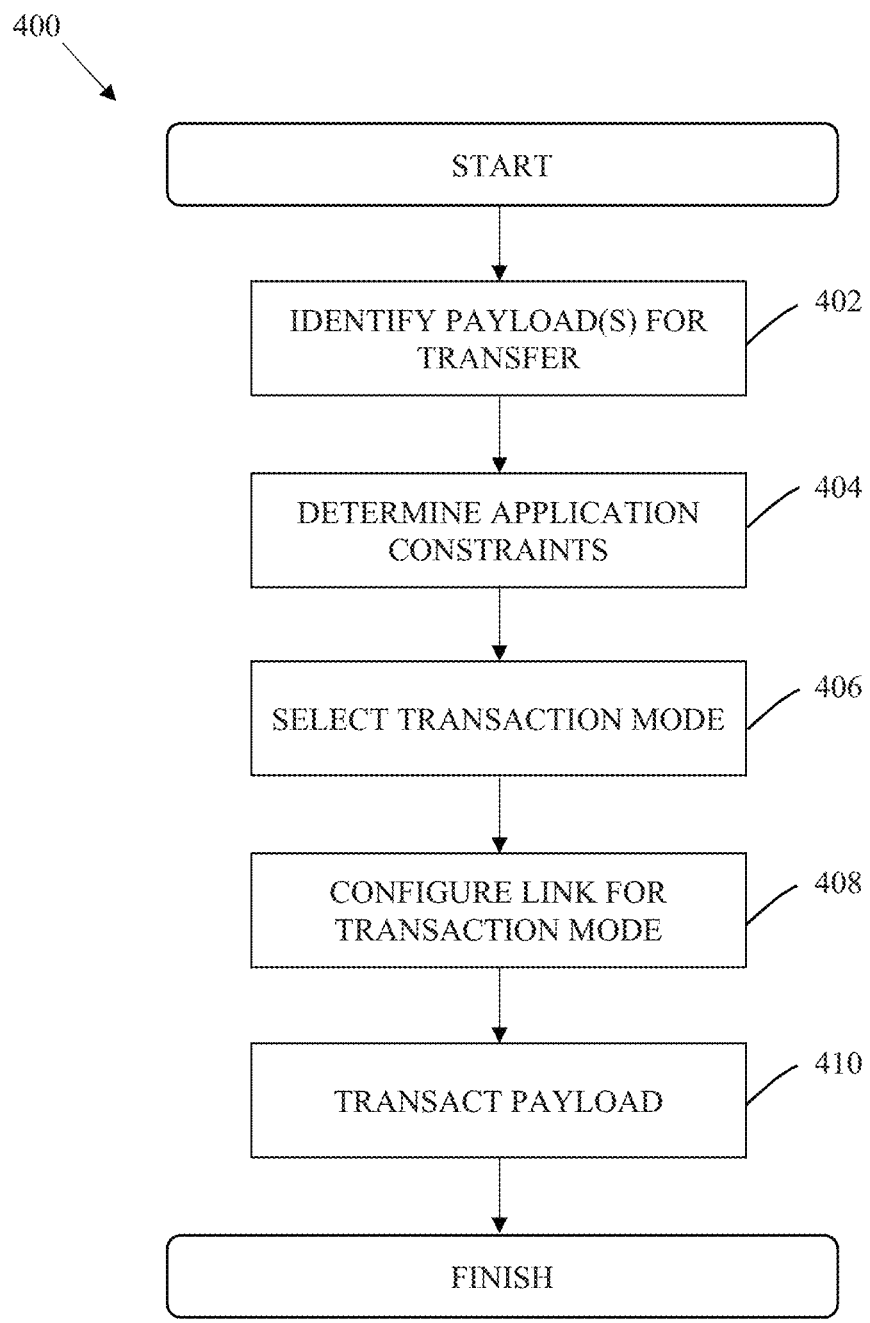
FIG. 4 illustrates one generalized method for transacting payload data over an inter-processor communication (IPC) link between two or more independently operable processor apparatus, in accordance with the various principles described herein.

FIG. 4 illustrates one exemplary method 400 for transacting payload data over an IPC link between two or more independently operable processor apparatus.

In one embodiment thereof, the IPC link may include at least one pair of unidirectional pipes. In some variants, the IPC link may alternatively or additionally include at least one pair of bidirectional or multidirectional pipes. In various other embodiments, one processor may be in data communication with a plurality of other processor apparatuses via one or more IPC links. For example, in some embodiments, the host may be connected to multiple peripheral processors. In other embodiments, multiple host processors may be connected to a given peripheral processor. More generally, any number of hosts and any number of processors may be connected together according to the aforementioned IPC bus.

As a brief aside, artisans of ordinary skill in the related arts will readily appreciate that a "payload" as used herein, broadly refers to a portion of transmitted packetized data that includes an intended message. The payload excludes protocol information used for e.g., routing the message, error correction, flow control and other transactional overhead. For example, in addition to the payload, a data packet (including, e.g., a transfer descriptor) may include metadata or other fields sent solely to facilitate the delivery of the payload. In another example, the payload may be included with a segment of a packet that is typically not used for payload delivery, such as a header or footer component of a transfer descriptor.

As used herein, a "footer" component refers to data associated with, and following, a data structure or a portion thereof (e.g., a transfer descriptor, completion descriptor). As used herein, a "header" component refers to data associated with, and preceding, a data structure or a portion thereof (e.g., a transfer descriptor, completion descriptor). A footer (and similarly, a header) may be an optional component of a transfer descriptor or a completion descriptor which may be used to include data (e.g., a payload) or metadata that describes the descriptor, packet, and/or payload.

At step 402, a processor apparatus identifies one or more payloads for transaction. The payload may be generated by the processor for transmission. In addition or alternatively, the payload may be scheduled for reception from another processor, a local memory buffer, and/or an external memory module. In one exemplary scenario, a host (application processor (AP)) and a peripheral (baseband modem (BB)) schedule a transaction of one or more payloads for an application (e.g., a Bluetooth link) via an IPC link. The transacted payload is used by the BB modem to perform a Bluetooth transaction with one or more Bluetooth attached peripherals.

In some embodiments, the payload is (or will be) encapsulated within a packet based protocol. In one such variant, the packet based protocol is delivered via a pipe (data stream) of an IPC link. In one exemplary variant, the pipe of the IPC link is represented by a transfer descriptor ring (TDR) including one or more packets stored within one or more transfer descriptors (TDs).

As a brief aside, data (payloads, packets, TDs, and/or any other structured data) may vary widely in size between different applications. However, different data structures may have size constraints to e.g., reduce complexity and/or simplify design constraints. For example, packets may be maximally sized at 1500 Kilobytes (Kb) so as to minimize packet routing hardware complexity. In another example, a TD may be maximally sized at 2 Kb so as to simplify memory management within the host and/or peripheral processors. Within this context, data structures may be joined together to form larger data structures, such that virtually any size transaction may be handled. For example, a TDR that has four (4) linked TDs can transfer a payload of up to 8 Kb in size.

Referring back to step 402, the processor apparatus is configured to execute a computer program composed of instructions and/or augment firmware, and/or hardware to perform logical operations described herein. Artisans of ordinary skill in the related art would readily appreciate that other components may be substituted given the contents of the present disclosure. Common examples of common processing alternatives include, without limitation, reduced instruction set computer (RISC) processors, complex instruction set computing (CISC) processors, field-programmable gate arrays (FPGAs), application specific integrated circuits (ASICs), and programmable logic devices (PLDs).

In one embodiment, the one or more data packets are to be provided over a bus interface to/from the processor apparatus. The bus interface may be singly mastered or multiply mastered. In one such variant, the bus interface is an IPC link. Other examples of a bus interface usable with the present disclosure include without limitation, Peripheral Connect Interface (PCI), PCI-Express (PCIe), Small Computer System Interface (SCSI), Thunderbolt, FireWire (and other implementations of IEEE 1394), Universal Serial Bus (USB) and variants thereof (e.g., USB-C, Micro-USB), and any other high speed bus interface.

In some embodiments, packet delivery may be configured differently for each pipe based on the payload application and/or application constraints. For example, in one such case, the size of the footer or header may have a variable size that is defined when a TDR is opened. As previously noted, the footer and header are separate portions of the data structure and are distinct components from e.g., the packet payload body (which may contain various fields as noted elsewhere below).

During normal delivery, each payload may correspond to at least one packet. The payload may be stored in an area of a memory or buffer that is described by a transfer descriptor (TD). In some variants, portions of the payload may be placed into the components of a packet for delivery; the various components of the packet include e.g., a header, a footer, a body, and/or an address field.

Unlike normal delivery, in one exemplary embodiment, fields present in a TD or a CD may be modified to contain the entirety of the payload itself, such that writing and reading the TD or CD from one node to another results in delivery of the payload. Examples of such "repurposed" fields of a data structure (e.g., a TD or CD) may include without limitation e.g., header, footer, size, tag, and status fields.

While the foregoing description is presented within the context of a packet based protocol, those of ordinary skill in the related arts will readily appreciate that non-packet based protocols may be substituted with equivalent success, given the contents of the present disclosure. For example, in some cases the payload may be transferred via a circuit-switch or other dedicated signaling protocol. Common examples of such connectivity include e.g., general purpose input output (GPIO), I2C, I2S, and any number of other dedicated bus protocols.

At step 404, the processor determines one or more application constraints for the payload. In one exemplary embodiment, the application constraints are based on one or more application profiles selected from a Bluetooth or Bluetooth Low Energy (BTLE) wireless communication application. Common examples of wireless communication applications that may be associated with various application constraints include, but are not limited to, infrared signals, ZigBee, radio-frequency identification (RFID), near-field communication (NFC), cellular, Wi-Fi, and Global Positioning System (GPS). Persons having ordinary skill in the relevant art will recognize that various wireless communication protocols may be enabled depending on the hardware (e.g., types of baseband modem).

In one such example transaction, the payload corresponds to an Host-Control Interface (HCI) command for transmission to a Bluetooth-enabled peripheral (e.g., a wireless mouse, earbuds, a keyboard). For example, the HCI command may be used to create a connection to a Bluetooth device (via a "Create_Connection" command), or to terminate an existing connection to a device ("Disconnect"). As another example, HCI events may be generated and transmitted to indicate that a new connection has been formed ("Connection_Complete_Event"), or that a new connection is trying to be established ("Connection_Request_Event"). Other common Bluetooth specific payloads include without limitation: Asynchronous Connection-Less (ACL), Synchronous Connection-Oriented (SCO), and/or proprietary debug interfaces. Each of the aforementioned HCI, ACL, SCO, and debug interfaces correspond to one or more application requirements and/or constraints, as are described in greater detail hereinafter.

In some embodiments, each payload may be associated with different application requirements and/or constraints. Such considerations may include for example: transaction timing requirements, size of transaction, and transaction protocol (e.g., a command, data, and/or event acknowledgement). More generally, artisans of ordinary skill in the related arts will readily appreciate that use application requirements may vary widely depending on usage, technical limitations, design limitations, and other implementation specific considerations. For example, Bluetooth and BTLE use applications are characterized by reduced latency and power usage over low data rate wireless connectivity. Cellular and/or Wi-Fi applications are generally used for large transfers of data (e.g., video) which may be more tolerant to latency. Still other applications may trade-off other considerations e.g., power, speed, memory usage, processing complexity, latency, throughput, and/or any number of other factors.

While the foregoing discussion is presented in the context of wireless communications, the various principles described herein are not so limited. In some embodiments, the application may be a media application. Common examples of media applications include audio codec operation, video codec operation, human interface operation (e.g., touchscreen, keyboard, mouse, headset, and/or any other human interface peripheral). Persons having ordinary skill in the relevant art will recognize that various media interfaces may be enabled depending on the hardware (e.g., displays, speakers, microphones, and human interface elements, both indigenous to the device and/or externally coupled to the device).

In other embodiments, the application may hybridize one or more subsidiary applications. For example, in some cases an application may include both wireless communication and media application aspects. In one such example, a Bluetooth headset may require both Bluetooth and headset functionality (e.g., audio codec operation). In another example, a Short Messaging Service may require both limited cellular functionality and user interface functionality. Still other common variants may combine Wi-Fi connectivity with user applications.

In some embodiments, the application may be used for various wireless device-specific implementations. Examples include a media application (e.g., earbud, headset, speaker peripherals), data input (e.g., computer mouse, keyboard), computing and home appliances (e.g., printer, thermometer, TV), and monitoring and synchronization of data between one or more of the foregoing. Variants may also enable processing and/or transfer of larger data, such as images, animations, videos, and documents.

In some embodiments, the one or more application constraints are predefined based on e.g., the application requirements. For example, an SCO command may be associated with a fixed synchronous time interval. In other embodiments, the one or more application constraints may be dynamically determined based on a variety of different changing or unknown parameters. One common customization technique selectively adjusts or modifies application operation to suite a user's taste to e.g., improve performance, improve responsiveness, reduce power consumption, and/or minimize memory footprint. For example, a user may constrain an application to minimize time spent in low power states to improve performance, or vice versa.

Referring back to step 404, a processor may inspect the contents of the payload to identify a payload's corresponding application and/or application requirements. In other embodiments, the contents of the payload may be encrypted or otherwise hidden, consequently the application and/or application requirements may be identified based on packet headers, footers, and/or other non-payload fields. For example, in some cases, the processor may identify one or more addresses or logical ports in order to determine the underlying application.

In another embodiment, a processor may identify the payload's application and/or application requirements via out-of-band information. For example, a user may expressly indicate that a Bluetooth device is being used via an operating system (O/S) switch or other user configuration. In yet another embodiment, the processor may be pre-programmed or otherwise dedicated to specialized hardware connectivity. For example, a dedicated host processor may be configured to transmit or receive Bluetooth data only, via a dedicated data pipe that is limited to, for example, 1 kilobyte packets. In still other examples, the processor may infer the payload application based on e.g., historic usage, or triggering events that are associated with certain types of applications. For example, a phone may infer that a user that is moving at high speed or via a known driving route, that receives a voice call, will want to answer the call via a Bluetooth headset.

At step 406, the processor selects a transaction mode for transacting the payload. In one embodiment, the selection of the transaction mode is based on predefined set of characteristics for the payload's determined application and/or application constraints. For example, the processor apparatus may select a HCI transaction mode for a payload that was determined to be a Bluetooth HCI command or event. In other examples, the processor may select ACL transaction mode, SCO transaction mode, and/or a debug transaction mode, based on the Bluetooth use scenario.

In some embodiments, the selection may be inferred from application usage. For example, if the payload is packetized, and packets are detected sporadically and/or originate from, or are addressed to, a Bluetooth device (e.g., commands from a peripheral user device such as a wireless mouse), then the processor may select a SCO transaction mode, which is designed to accommodate low data rate periodic traffic. In one variant thereof, SCO may be selected if the processor detects certain peripheral devices (e.g., a mouse) and/or if the average number of packets over a time period remains below a threshold value. In another variant, SCO may be selected if the packets are received periodically (at time intervals having a predetermined error range).

In some embodiments, the selection may be inferred from the usage of multiple applications and/or other usage considerations. For example, a processor may detect the usage of multiple protocols (e.g., BT and BTLE concurrently) that results in the selection of the ACL transaction mode, which is designed to accommodate both high-throughput traffic as well as low-throughput traffic.

In still other embodiments, the selection may be inferred from the usage of processing resources such as memory or processing time slots. For example, payloads may be mapped to a large area of memory for packetized delivery; thus a processor may infer that the payload may be delivered via a bulk data packet transport. Alternatively, a payload that has been mapped to a number of approximately equivalently sized memory chunks may be inferred for e.g., a periodic packet delivery cycle (e.g., a streaming data delivery transaction mode).

While the foregoing selections of transaction modes are specific to various Bluetooth profiles, artisans of ordinary skill in the related arts given the contents of the present disclosure will readily appreciate that "genericized" or non-application specific transaction modes could be substituted with equivalent success. Examples of such genericized transaction modes might include e.g., low power transactions, low latency transactions, high throughput transactions, synchronous/isochronous transactions, dedicated pipe transactions, reduced memory/processing transactions, and/or any number of other optimized transaction modes.

As previously noted, the foregoing discussion is presented in the context of wireless applications, however the various principles described herein are not so limited. For example, various transaction modes may be enabled for other application specific consumption. An audio transaction mode may provide very low latency for a constant throughput. A streaming video transaction mode may support a wide range of throughputs but require a minimum latency and/or total bit rate. Other forms of transaction modes may be used to support e.g., machine-to-machine operation (which is generally extraordinarily low data rate and very minimal power consumption), Internet of Things (IoT), and/or any number of other application specific transaction modes.

In some embodiments, multiple transaction modes may be available for selection, and the processor selects only one. In some hybrid cases an application may include both wireless communication and media application aspects; for example, a Bluetooth headset may require both Bluetooth and headset functionality (e.g., audio codec operation). Thus, processor may select the Bluetooth specific transaction mode or the audio codec transaction mode. In some variants, the processor may select the transaction mode that encompasses the requirements of each of the multiple possible transaction modes (e.g., the "loosest" transaction mode). In other variants, the processor may select the transaction mode that prioritizes the requirements of one of the multiple possible transaction modes (e.g., the "prioritized" transaction mode). In still other variants, the processor may select the transaction mode that optimizes other considerations (e.g., device may be running in a low power mode; thus the transaction mode is selected based on considerations other than the underlying application requirements).

At step 408, a link is configured with the selected transaction mode. As previously noted, in one exemplary embodiment, the payload is (or will be) encapsulated within a packet based protocol for transmission to, or reception from, the processing apparatus. In one such variant, the packet based protocol is delivered via a pipe (data stream) of an IPC link. For example, the processor apparatus may open, configure, and/or reconfigure a pipe of the IPC to operate in the selected HCI transaction mode for a HCI payload. In other examples, the processor may open, configure, and/or reconfigure a pipe for ACL transaction mode, SCO transaction mode), and/or a debug transaction mode.

As used herein, a "pipe" refers to a unidirectional first-in-first-out (FIFO) communication channel for communicating between two logical endpoints. During operation, software may create or "open" pipes and destroy or "close" pipes. In one exemplary embodiment of the present disclosure, each pipe may further be configured or modified to suit a variety of different applications and/or application constraints. For example, a pipe may be configured to transact payloads within one or more packets. Thus, the processor may packetize the payload by e.g., appending or encapsulating the payload within a packet data structure.

Configuration of the link with the appropriate transaction mode may include modification to the transactional data structure. As previously noted, existing implementations of the IPC link only provide a single transaction mode that was inherited from previous PCIe implementations. Various embodiments of the present disclosure alter the existing data structures used for transfer descriptor (TDs), transfer descriptor ring (TDRs), completion descriptor (CDs), and completion descriptor rings (CDRs), so as to suit various application and/or application constraints.

Figure 5:
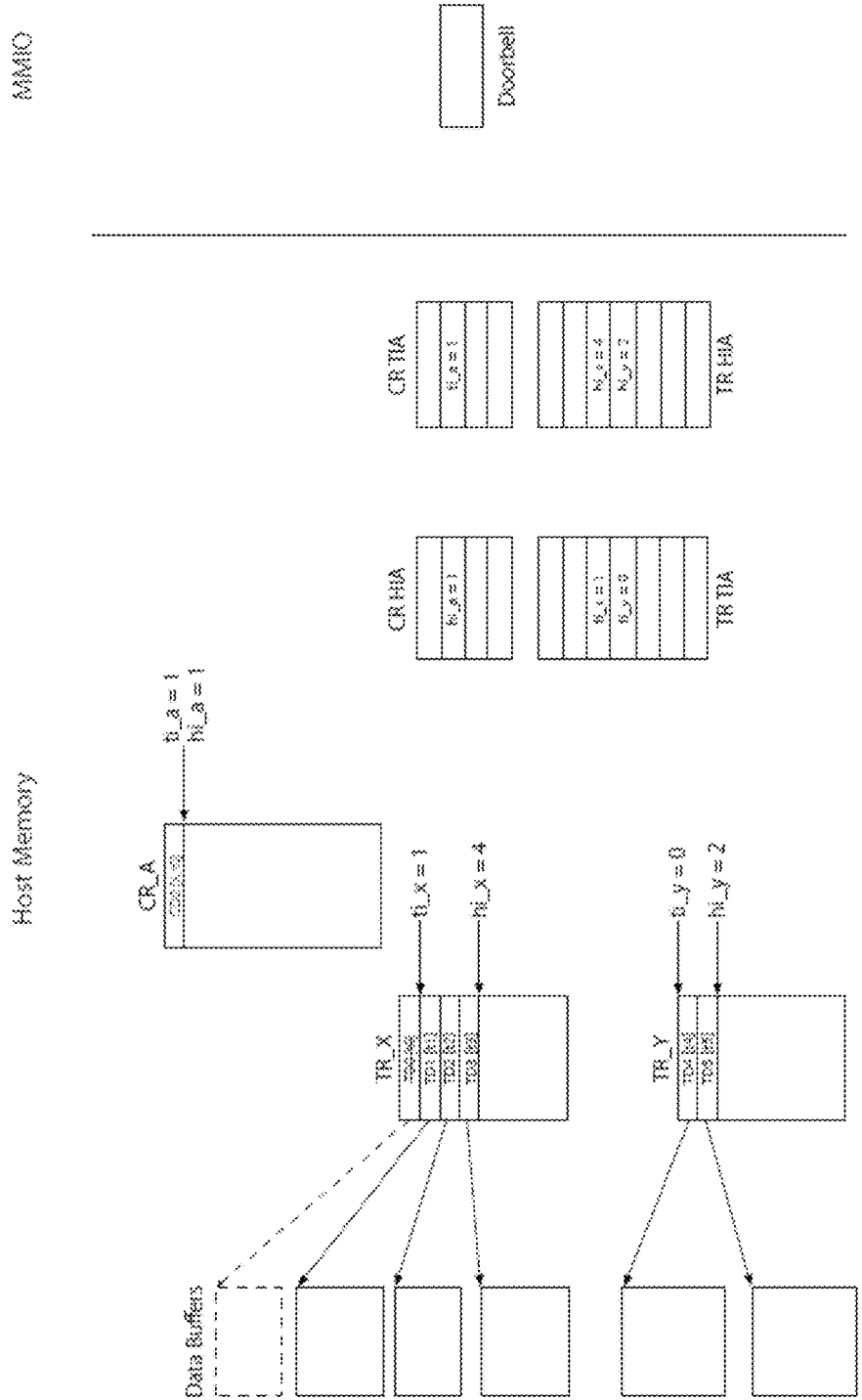
FIG. 5 illustrates a memory layout with two unidirectional pipes shown, useful for illustrating various principles described herein.

As a brief aside, existing IPC transactions use external memory modules or dedicated buffers to carry the payload, as shown in FIG. 5. More specifically, FIG. 5 illustrates a memory layout with two unidirectional pipes shown, TR_X and TR_Y. The host may queue one or more TDs and inform the peripheral by writing an index entry, for example, "hi_x=4" to indicate 4 TDs in a TDR (TR_X) residing in host-side memory. After the peripheral transfers a buffer (t0), the peripheral may update a CDR (CR_A) with a CD (CD0) containing an identifier for the corresponding TDR. The peripheral may then update the head index of the CDR (for example, "hi_a=1") and the tail index of the TDR (for example, "ti_x=1"). Upon seeing the CD (CD0), the host may free the corresponding data buffer and update the tail index of the CDR (for example, "ti_a=1").

In contrast, various embodiments of the present disclosure store the payload may in an area of a memory or buffer that is described by a transfer descriptor (TD) or a completion descriptor (CD), and the processor encapsulates the TD or CD into one or more packets by adding e.g., a header, a footer, a body, and/or an address field. In other such embodiments, the payload may be stored in an area of a memory or buffer that is allocated for a transfer descriptor (TD) or a completion descriptor (CD), and the processor effectuates delivery of the payload by merely writing or reading to the TD or CD. In still other embodiments, the transaction mode may include transmitting the payload within (i) an optional footer component of a TD or CD and/or (ii) an optional header component of a TD or CD. The TD may be used by the host processor when the host processor is transmitting the payload, and the CD may be used by the peripheral processor when the peripheral processor is transmitting the payload. Specifically, in one embodiment, depending on the size of the payload, the host processor may place the payload within the TD (or within the CD if the peripheral processor is transmitting the payload), and deliver the TD to the peripheral processor.

Configuration of the link with the appropriate transaction mode may include modification to the transactional protocol. Various embodiments of the present disclosure alter the manner by which TD, TDR, CD, and CDR messaging occurs, so as to suit various application and/or application constraints.

For example, some transaction modes may use a "virtual" TDR that has a head index and a tail index but no actual data stored in memory (such as a memory module external to the host or the peripheral processor, e.g., DRAM 108A, 108B). In one embodiment, such virtual TDR operation may be used by the host to queue a payload transfer via the optional footer and/or optional header structure of a CD on the peripheral side. In some variants, the peripheral may immediately transfer the CD (where the requested payload for transfer is included in the optional footer and/or optional header of the CD). The data transfer may, in effect, be "fire and forget" since the data is not occupied or locked in a host memory or buffer region. Responsive to receiving the CD, the host may take the payload out of the optional header and/or optional footer. Thus, by consolidating the TD and virtual TDR functionality together, the transactional overhead can also be streamlined.

In another such example, the host processor may place packets making up the payload into the optional footer structure of the TD. In other implementations, the payload may be placed in an optional header structure of the TD, or elsewhere in the body of the TD. In some embodiments, the footer, header, and/or body of a CD may carry a payload placed by a peripheral processor. As noted earlier, existing TD implementations would point to a location of an external memory. In contrast, various implementations described herein point to a location in memory, the TD itself contains the payload of interest, thereby saving one transaction by the peripheral processor.

In another embodiment, the body of the TD or CD may be used to "stuff" the payload. The body may accommodate the payload packet in the size field (24 bits wide), address field (64 bits wide), unique tag field (16 bits wide), status field (8 bits wide), etc. In one variant, a predetermined portion of one or more of the above fields may be reserved for the payload.

In another embodiment, the processor may detect the size of the payload. Depending on the size of the payload, the payload may be placed in an external memory or in the TD or CD. In one variant, whether it exceeds a threshold range determines where the payload is placed. These mechanisms will be described in more detail with respect to FIGS. 4A-4D below.

In one or more embodiments, the transactional protocol may additionally, or alternatively, include transmitting a head index and/or a tail index within a so-called doorbell (i.e., a message that points to an index of TDs).

As used herein, a "doorbell" signal refers to any signal, register, or interrupt that is used by the host to indicate to the peripheral that there is some work to be done (e.g., data processing, control flow, etc.). The reverse is also applicable, where the peripheral indicates work for the host. For example, in one implementation, one processor (e.g., the host) will place data in a shared memory location(s), and "ring the doorbell" by writing to a designated memory location (the "doorbell region"); responsively, the peripheral processor can process the data. The shared memory location may include a host-side buffer, an external memory, or some other mutually accessible data structure or location.

Moreover, a processor may provide an array of so-called doorbell registers, and a so-called head pointer doorbell array (HPDA) which is further indexed by pipe number. The host processor notifies the peripheral processor of a new TD in a TDR by writing the head pointer value in the doorbell register at a pipe number offset inside the HPDA. Similarly, the host provides a so-called tail pointer array (TPA) in host memory that is indexed by pipe number, which is updated by the peripheral processors with tail pointer values to indicate completion of a TD.

Returning to step 408, in one embodiment, the host processor "rings the doorbell" (e.g., sends the doorbell message to the peripheral processor), where the doorbell itself includes the head index and/or the tail index. In prior implementations, the doorbell would have pointed to an index residing on another location, such as an external memory. The inclusion of the index within the doorbell itself according to the present disclosure obviates one transaction by the peripheral processor, since the peripheral processor need not access the memory on which the index resides, e.g., by programming a DMA (direct memory access).

Moreover, in some embodiments, the host processor may prioritize transfer and receipt of packets or payloads corresponding to the use application determined at step 404. In one variant, the prioritization may enable the prioritized packets to be queued, transmitted, or received before other packets. Distinct payloads may thereby be saved and/or queued before transmission. For instance, a buffer including multiple packets may be prioritized so as to enable transmission of one or more prioritized packets.

In some variants, an accumulation time may be set indicating the maximum amount of time for accumulating data before transmission. In one implementation thereof, a peripheral processor may accumulate data in its local buffer region before sending the data to the host. In another implementation, the peripheral or host may maintain a timer for such accumulation. In another implementation, the peripheral or host may specify a size threshold that indicates the maximum size of data that the peripheral processor may queue. In another implementation, a maximum queue size for the accumulated data may be set before transmitting the data.

The modes described above may therefore reduce multiple transactions (e.g., retrieval by DMA) by, e.g., the peripheral processor. Additional benefits arise from utilizing one or both these mechanisms: reducing the number of transactions may reduce latency (response times), power consumption, and/or throughput. These mechanisms will be further described below in the context of HCI, ACL, SCO protocols.

At step 410, the processor transacts the payload according to the transaction mode that is configured at step 408. As noted above, the transmission may include a transmission of one or more packets and/or distinct payloads. When the transaction of the payload is completed, the processor returns to step 402. The following discussions of FIGS. 4A-4D present four (4) exemplary transactions (e.g., implementations of step 410).

Exemplary Host Control Interface (HCI) Transaction Mode—

Figure 4A:
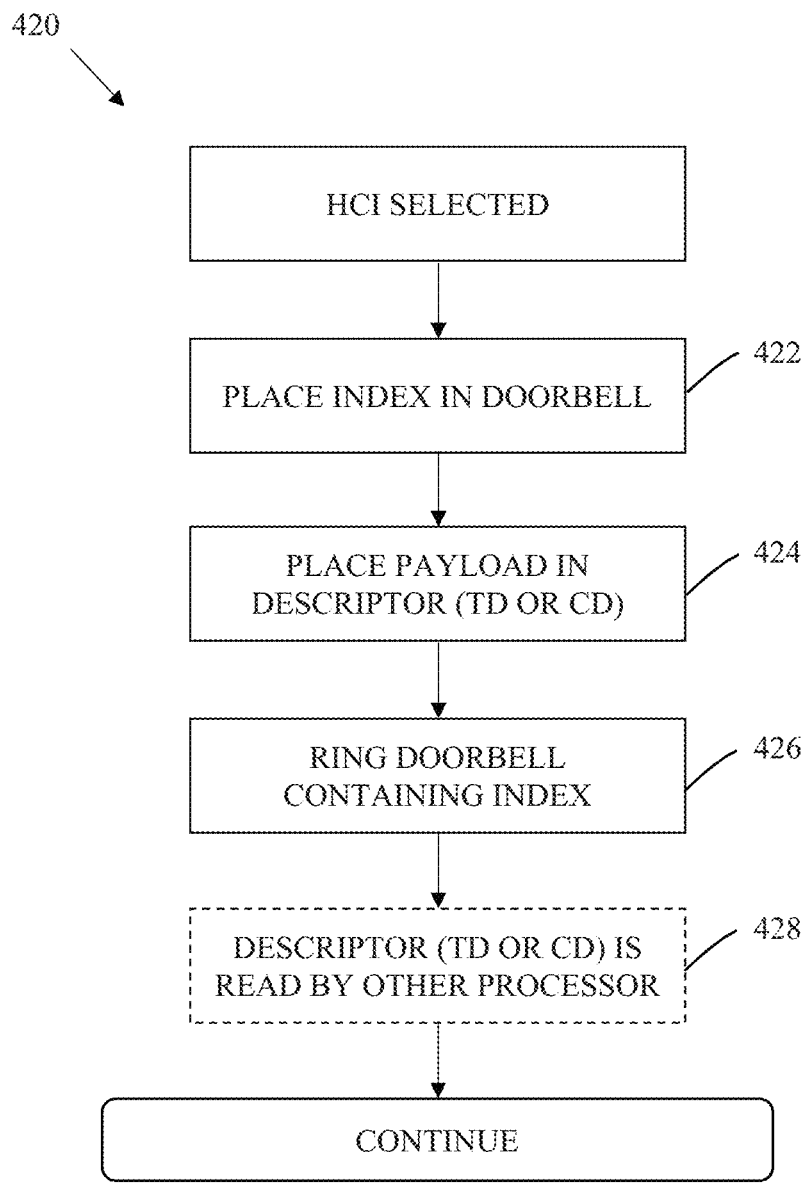
FIG. 4A is a logical flow diagram of an exemplary method for transacting a HCI (Host-Control Interface) payload via the HCI transaction mode over an IPC link, in accordance with the various principles described herein.

FIG. 4A is a logical flow diagram of an exemplary method 420 for transacting an HCI payload via the HCI transaction mode over an IPC link.

At step 422, a processor apparatus places an index into a doorbell message. In one embodiment, a host processor may place a transfer descriptor ring (TDR) head index into the message indicating a payload transfer for the peripheral processor to service. In one embodiment, a peripheral processor may place a TDR tail index into the message indicating that the peripheral processor has queued the payload transfer for service.

In one embodiment, a peripheral processor may place a completion descriptor ring (CDR) head index into the message indicating that the peripheral processor has completed the payload transfer. In one embodiment, a head processor may place a CDR tail index into the message indicating acknowledgment of the completion event.

At step 424, the processor places the payload in one or more transfer descriptors (TD) of the TDR. More directly, the HCI payload (e.g., "Create_Connection", "Disconnect", "Connection_Complete_Event"), "Connection_Request_Event") is piggybacked onto TDs of a TDR.

In one embodiment, the payload may be placed into an optional footer component of the TD. In another embodiment, the payload may be placed into an optional header component of the TD. In yet another embodiment, the payload may be placed in the body of the TD. In one or more variants, the payload may be placed in different portions of the body, such as the size field, address field, unique tag field, status field, etc. In some implementations, the process may reserve a predetermined portion of one or more of the above fields for the payload. In other variants, the payload may be distributed in more than one components. For example, the payload may be split up and placed in both the footer and the header components of the TD.

In another embodiment, the size and/or number of payloads may optionally be determined before placing the payload(s) into the TD. For instance, if the processor determines that the payload (e.g., the packets including the payload) are sufficiently small in size, additional payloads may be aggregated into a single TD to conserve additional transactions, reduce power usage, and improve latency. In one variant, the size may be predetermined. For example, given the maximum size of HCI commands and events of approximately 280 bytes, the maximum threshold size may be capped at 125 bytes. If the processor detects a plurality of HCI commands or events that are below 125 bytes, the processor may include two such commands or events in one TD. If the processor detects HCI commands or events that are below 60 bytes, the processor may include three such commands or events in one TD. In some cases, the size of an HCI command or event may vary depending on, e.g., the number of parameters conveyed and/or the size thereof. In some variants, the determination of size and/or number of payloads may be used to, as noted above, distribute the payloads across various components and fields, e.g., header, footer, size field, address field.

In one variant, the payload may be placed into the TD or CD as each payload is received. In another variant, the payload may be placed into the TD or CD in batches, so as to queue or buffer multiple TDs or CDs, thereby preventing "ping pong" transactions in which transmission occurs after each payload is ready for transmission. Batching may allow multiple payloads to queue up before transmission, and may arise in situations where latency is less of a priority, and power conservation is desired.

At step 426, the processor (e.g., host processor) may "ring the doorbell" via the IPC link. In one embodiment, the host processor transmits a message to the other processor (e.g., peripheral-side processor). The doorbell message may include the TDR head index. By including the head index in the doorbell, the receiving peripheral processor receives the head index directly from the host processor, rather than having to service the doorbell by accessing external memory. In this manner, the optimized doorbell messaging obviates a transaction with, e.g., an external memory.

Similarly, in another embodiment, if the peripheral processor is the one transmitting a payload, the peripheral processor rings the doorbell by transmitting a message to the host processor. Here, this message may contain a TDR tail index. In other embodiments, the peripheral processor may signal a CDR head index to the host via the doorbell. In yet other embodiments, the host processor may send a CDR tail index to the peripheral via the doorbell.

At step 428, the descriptor (e.g., TD or CD) containing the payload (added in step 424) is read or retrieved by the other processor. In one embodiment, the other processor reads the descriptor via an IPC link between the two independently operable processors. Those of ordinary skill in the related arts, given the contents of the present disclosure, will appreciate that other bus interface standards may be substituted with equal or similar success.

Once the payload has been retrieved by the other processor, the process returns to step 402.

Exemplary Asynchronous Connection Less (ACL) Transaction Mode—

Figure 4B:
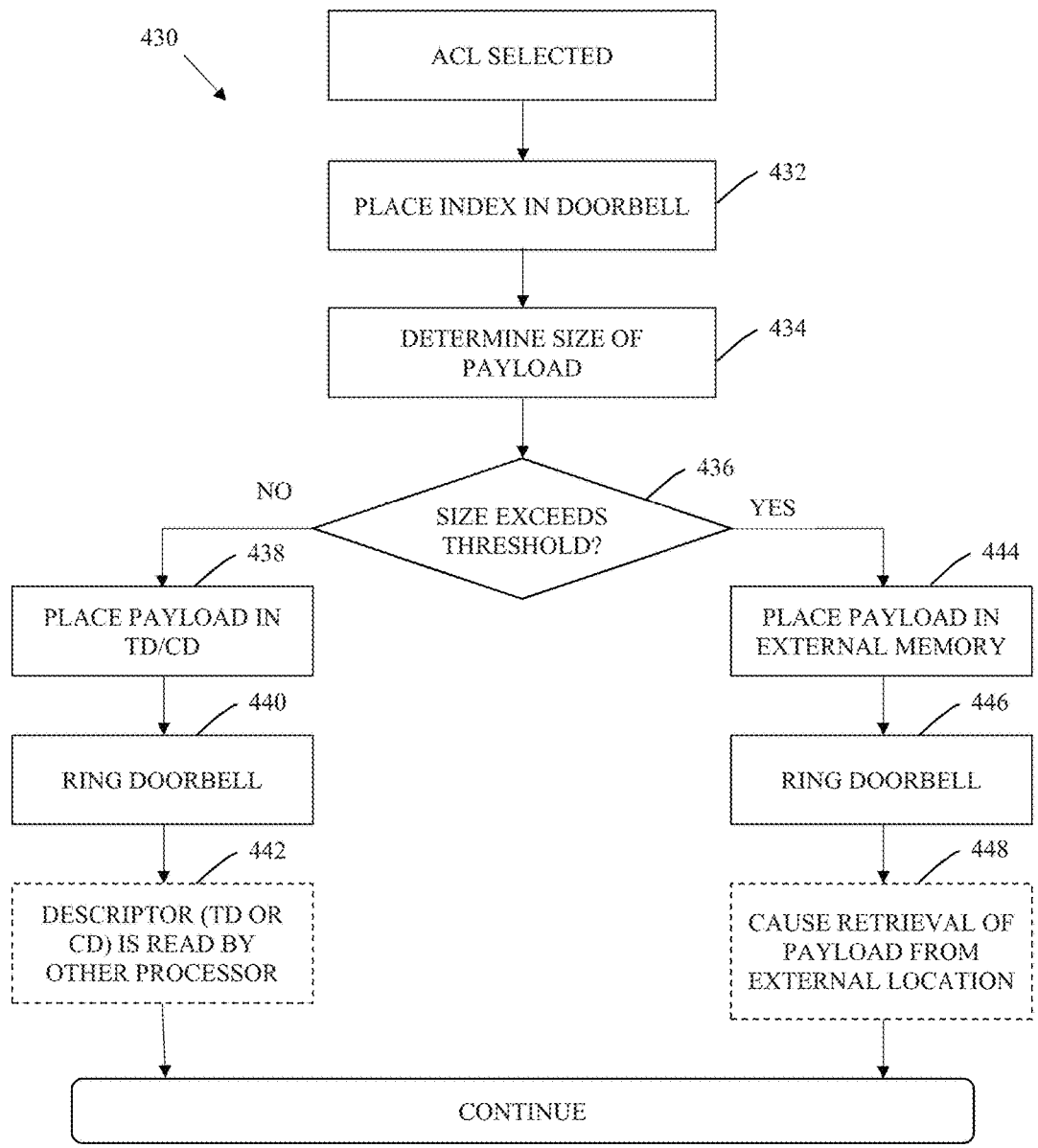
FIG. 4B is a logical flow diagram of an exemplary method for transacting an ACL (Asynchronous Connection-Less) payload via the ACL transaction mode over an IPC link, in accordance with the various principles described herein.

FIG. 4B illustrates an exemplary method 430 for transacting an ACL payload via the ACL transaction mode over an IPC link.

At step 432, a processor places an index (e.g., a TDR head index or a TDR tail index) into a doorbell message.

At step 434, the processor determines the size of the payload to be transmitted. In current implementations, the size of Bluetooth ACL packets may reach up to approximately 1 kilobyte (1024 bytes).

In one embodiment, the size of each payload may be determined and considered for transmission one at a time. In another embodiment, the size of multiple payloads may be determined in aggregate. In some variants, some or all of the payloads may be inserted into a TD or CD (per step 438). In some variants, some or all of the payloads may be placed into an external memory. In another variant, each of the multiple payloads may be divided and designated for separate delivery via one or more TD (or CD) and/or the external memory (see steps 438, 444). In yet another variant, packets including a single payload may be divided and placed into one or more TD (or CD) and/or the external memory.

At step 436, the processor determines whether the size of the payload exceeds a threshold. In one embodiment, the size of the payload is a predetermined static size value or range based on e.g., Bluetooth application limits. In another embodiment, the size of each packet making up the payload is dynamically determined to optimize other system considerations (e.g., messaging overhead, power consumption, transactional complexity). In some embodiments, the threshold size may be limited to a specific range based on e.g., Bluetooth application requirements. For example, the threshold size may be between 256 to 1024 bytes (i.e., 256 bytes or above). One having ordinary skill in the art will appreciate that many other thresholds or ranges are possible.

In one variant, the threshold size may be predetermined based on the application (step 404), transaction mode (step 408), etc. In another embodiment, the threshold size may be determined dynamically as changes are detected on the application, transaction mode, etc. In one or more embodiments, the size of packets or payloads may be considered in aggregate or individually when determining whether the size exceeds the threshold as described above.

Dependent on whether the size of the packet or payload exceeds or does not exceed the threshold (as determined at step 436), the processor places the payload or packets making up the payload within e.g., TD, CD, external memory, buffer, or a combination thereof before transmission. In some embodiments, the payload may be divided into smaller packets so as to contain the payload in multiple TDs or CDs, thereby obviating the need to place the whole payload to the external memory for retrieval by another processor.

The delivery mechanisms for transmission via TD/CD or external memory, are described in greater detail below.

When the size of the packet does not exceed the threshold (step 438), the processor places the payload into the TD or CD. In one embodiment, the host processor may place the payload into the TD. In another variant, the peripheral processor may place the payload into the CD. In some variants thereof, the payload may be placed in the footer portion, a header portion, or the main body (including several fields) of the TD or CD.

At step 440, the processor "rings the bell" (e.g., sends a message to the peripheral processor) to indicate that a payload is ready to be retrieved. In one embodiment, the host processor sends the doorbell message to the peripheral processor. In another embodiment, the peripheral processor sends the doorbell message to the host processor. In one variant, the doorbell contains the index, e.g., TDR tail index, CDR head index.

At step 442, the other processor retrieves the descriptor (TD or CD). In one embodiment, the peripheral processor retrieves the TD containing the payload. In another embodiment, the host processor retrieves the CD containing the payload.

When the size of the packet exceeds the threshold (step 444), the processor places the payload into the external memory. In one embodiment, the host processor places the payload in e.g., DRAM for retrieval by the peripheral processor. In some embodiments, as noted elsewhere above, the payload may be divided and placed into the external memory as well as in one or more descriptors (TD or CD). Thus, in some variants, the payload may be partially placed into the external memory and partially transported via TD or CD. In some implementations thereof, the division of packets may be based on the threshold determined at step 436. That is, the portion(s) of the payload to be transmitted via TD or CD rather than an external location may be limited to the size threshold of step 436.

At step 446, the processor rings the doorbell to alert the other processor that the payload is ready to be retrieved. In one embodiment, the host processor sends a doorbell message containing the index (placed in step 432) to the peripheral processor. In some embodiments, the index (e.g., TDR head index) describes the location of the TD(s) to be retrieved, in effect pointing to the external location. In another embodiment, the peripheral processor sends the doorbell to the host processor, thereby causing the host processor to retrieve the payload in the external memory based on an index contained in the doorbell e.g., CDR head index.

In one embodiment, a "doorbell moderation" mechanism may be used that is particularly useful for high-throughput transactions (for example, where the payload or packet size exceeds the threshold). Specifically, a moderation threshold identifies the maximum number of bytes corresponding to the descriptors that may be queued or completed within a ring, before which the host must generate a doorbell. Doorbell moderation at the host processor ensures that a device can fetch multiple buffers in a batch for each doorbell without encountering excessive amounts of data. In another implementation, a moderation timer may be set. The moderation timer specifies the maximum time the host processor may wait before it must generate a doorbell. While the present discussion is directed to maximum data and time thresholds, artisans of ordinary skill given the contents of the present disclosure, will readily appreciate that minimum thresholds for data and time may be useful to prevent excessive doorbell ringing and/or processing churn.

At step 448, the payload (placed in the external location by the processor per step 444) is retrieved by the other processor. In one embodiment, the host processor causes the peripheral processor to program a DMA (direct memory access) transaction based on the index contained within the doorbell (placed in step 432). In one variant thereof, the doorbell contains instructions that are executable by the peripheral processor. In another variant, the peripheral processor is configured to automatically program a DMA upon receipt of a doorbell message but without a TD containing a payload.

With respect to the foregoing mechanisms, while the discussion of the embodiments focuses on the host processor's perspective, the peripheral processor may accomplish similar results with respect to transmission of payloads within CDs and indices (e.g., TDR tail index, CDR head index) within a doorbell. These mechanisms serve to reduce transactions by the host processor, improve latency, etc.

Once the payload has been delivered to the other processor, the process returns to step 402.

Exemplary Synchronous Connection Oriented (SCO) Transaction Mode—

Figure 4C:
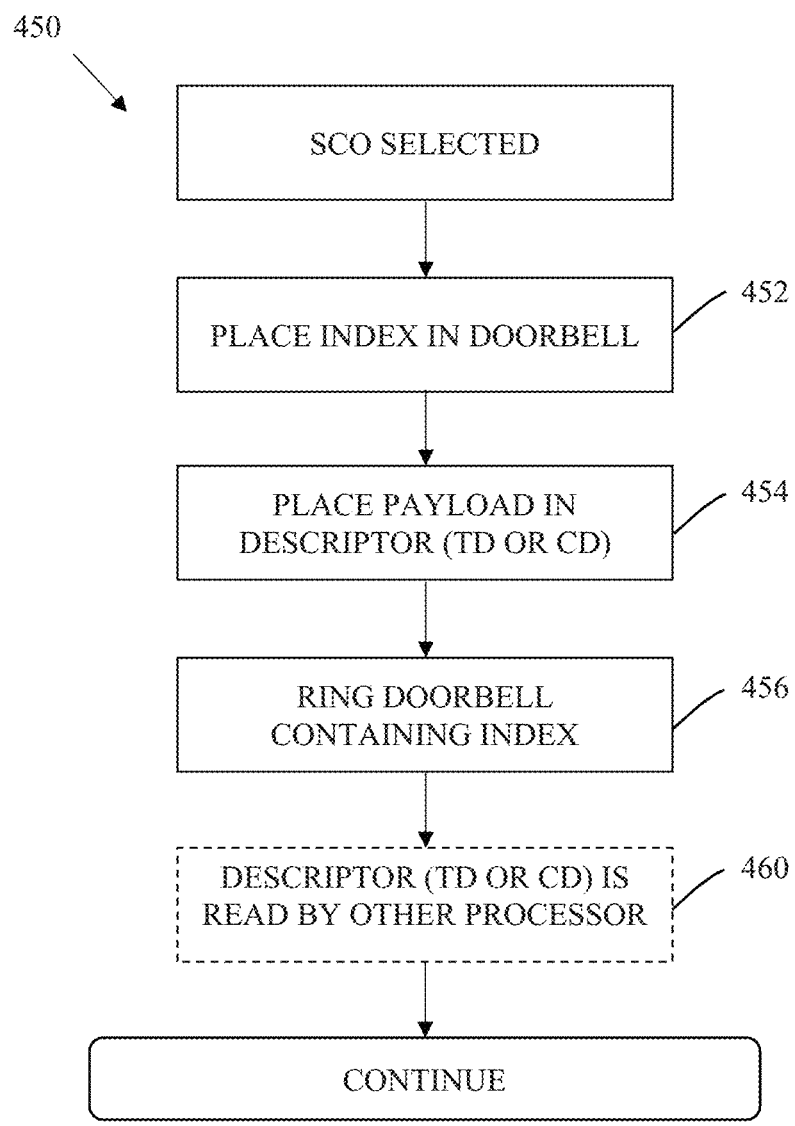
FIG. 4C is a logical flow diagram of an exemplary method for transacting a SCO (Synchronous Connection-Oriented) payload via the SCO transaction mode over an IPC link, in accordance with the various principles described herein.

FIG. 4C illustrates an exemplary method 450 for transacting a SCO payload via the SCO transaction mode over an IPC link.

At step 442, a processor places an index (e.g., TDR head index) into a doorbell message. In various embodiments, the index may include a TDR head index, a CDR tail index (the foregoing two being written by the host processor), a TDR tail index, or a CDR head index (the latter two being written by the peripheral processor).

At step 454, the payload of interest is placed into a descriptor (TD or CD). In one embodiment, the host processor places the payload into a TD. In another embodiment, the peripheral processor places the payload into a CD. In some variants thereof, the payload may be placed in the footer portion, a header portion, or the main body (including several fields) of the TD or CD.

At step 456, the processor rings the doorbell. In one embodiment, ringing the doorbell includes a host processor sending a message to the peripheral processor, indicating that a payload is ready for delivery. In another embodiment, the peripheral processor signals the host processor.

At step 458, the other processor retrieves the descriptor (e.g., TD or CD) containing the payload. In one embodiment, the peripheral processor can retrieve the TD via the IPC link. In another embodiment, the host processor can retrieve the CD via the IPC link.

Numerous embodiments, variants, and implementations of the foregoing are possible as noted with respect to the corresponding steps of FIG. 4C. Once the payload has been delivered to the other processor, the process returns to step 402.

Exemplary Debug Transaction Mode—

Figure 4D:
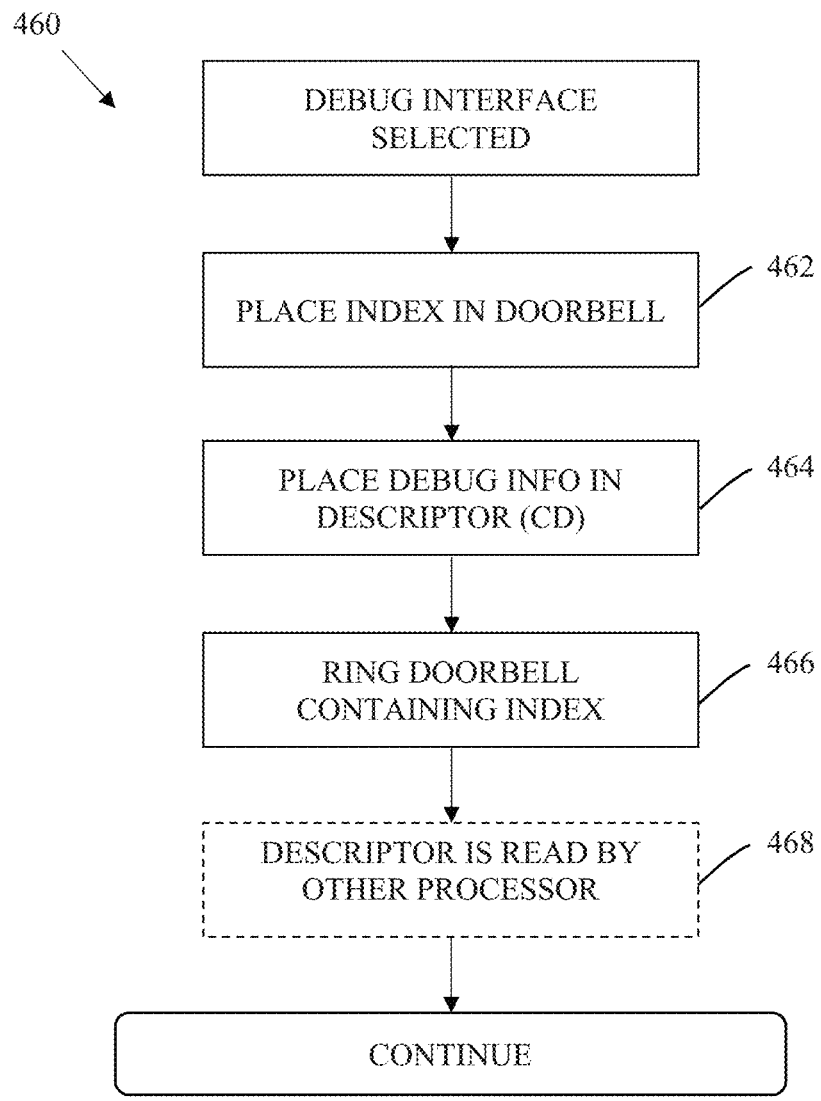
FIG. 4D is a logical flow diagram of an exemplary method for transacting a debug payload via the debug transaction mode over an IPC link, in accordance with the various principles described herein.

FIG. 4D illustrates an exemplary method 460 for transacting a SCO payload via the SCO transaction mode over an IPC link.

A processor may benefit from debugging information in order to diagnose any errors during or after transmission or receipt of a payload. For example, the host processor may transmit a payload (e.g., a HCI command), yet detect a delayed execution of the command or a delayed response. The host processor may never receive indication that the data sent to the peripheral was corrupted or unusable. The debug interface provides a separate way to communicate debugging or error information between the two (or more) processor apparatus without impeding on ongoing transactions via any other pipes in the IPC link, and saving transactions to the memory.

At step 462, a processor may place an index in a doorbell message. In one or more embodiments, the peripheral processor places a CDR head index (or TDR tail index) into the doorbell message.

At step 464, the processor may place debugging information in a descriptor to be conveyed. In one embodiment, the peripheral processor includes a payload including debugging information into a CD (or applicable TD). In several variants, the debugging information may include error codes, error messages, alerts, and/or additionally required information and missing information for the host processor to include with a future transaction. In other variants, the debugging information may also include scheduling information that may allow in-depth debugging at a later time. In one implementation, the scheduled future time may be determined based on transaction rate (e.g., number of average transactions falls below a threshold value), or when sufficient idle time has passed.

At step 466, the processor may ring the doorbell containing the index. In one embodiment, the index may comprise a CDR head index placed into a doorbell message, indicating to the host processor the impending delivery of the payload in the CD.

At step 468, the other processor retrieves the descriptor, thereby recovering the payload. In some embodiments, the payload may include the debugging information as noted with respect to step 464. When the host receives the payload, the process returns to step 402.

FIG. 6 illustrates an exemplary table summarizing the interfaces as discussed above with respect to FIGS. 4 and 4A-4D, along with data transactions available to each interface, and features relevant thereto.

Example Operation

Data transfers over Bluetooth require one or more of several types of protocols. Exemplary protocols and interfaces include the Host-Control Interface (HCI), the command interface for commands and events between host and peripheral processors, the Asynchronous Connection-Less (ACL) link, the Synchronous Connection-Oriented (SCO) link, and the debug interface. Artisans of ordinary skill in the related arts will readily appreciate that the various principles herein may be used with equivalent success with other Bluetooth protocols, such as low-energy link layer (LELL) or link manager protocol (LMP), the following discussions being purely illustrative.

As noted previously, PCIe (and IPC) links were not originally designed for transmission of data via different bus technologies, including Bluetooth. For example, a typical implementation of Bluetooth over IPC defines the HCI transport layer as a single pair of unidirectional pipes between, e.g., two (or more) independently operable processors such as host and peripheral processors. This approach is similar to, for example, how the Universal Asynchronous Receiver and Transmitter (UART) transport layer between the host and the host controller (as described in the Bluetooth Specification, previously incorporated by reference supra) enables HCI command, event, and data packets flow through this layer. Typically, IPC link resources are dynamically allocated to the single pair of pipes, so the IPC link resources must be conservatively sized to accommodate any type of Bluetooth transactions (which vary widely in requirements and characteristics). That is, the pipe pair in typical implementations may need to be configured to support the maximum throughput requirement of ACL, the latency requirement of SCO, and the packet count requirement of HCI, regardless of the actual Bluetooth content. This configuration may introduce undesirable inefficiencies with respect to latency and power usage in certain applications, e.g., communication between a Bluetooth-enabled external device and a user device (including between independently operable processors therein).

However, the present disclosure contemplates greater opportunities and options for IPC link optimization (especially in the absence of hardware acceleration on the peripheral controller side). In one exemplary embodiment, link usage may be optimized by defining several pairs of unidirectional pipes. For example, one pair of pipes may be defined for HCI commands and events, one pair for SCO, and one pair for ACL. That is, each pipe pair may be configured to support only the requirements of its respective protocol. In another embodiment, a given pair pipe may be defined to support more than one protocol concurrently.

In the exemplary embodiment of the present disclosure, the host processor and the peripheral processor are independently operable processors. In some embodiments, the peripheral processor may be a baseband processor configured to operate a radio component and communicate with one or more external peripheral devices (e.g., mouse, earbuds, headphones). Commands may be generated and/or executed elsewhere, e.g., by the host processor (e.g., an applications processor), and passed to the peripheral processor for transmission to an external peripheral device. Moreover, in one or more variants, the radio component may be Bluetooth-enabled such that the peripheral processor operates to communicate with a Bluetooth device. However, one having ordinary skill in the relevant arts will appreciate that various other implementations are possible, such that the peripheral processor may additionally or alternatively be capable of other modes of wireless communication, such as those noted elsewhere above. Each pair of pipes thereby may be optimized for traffic patterns of the logical transport that it serves, enabling greater efficiency of link use (including IPC links). More specifically, link use efficiency may be improved by minimizing protocol overhead, minimizing the time the link spends in an L0 power state, and minimizing transitions into and out of L0 (or L0s, L1, L2 or L3). The following descriptions are provided as specific implementations of the broader principles described herein.

Host-Control Interface (HCI)

HCI is the control interface for data transmission over Bluetooth of HCI commands and events. In most cases, the HCI interface is not oriented for peak throughput, but rather, for responsiveness. Consistent with the foregoing, HCI commands and events have a maximum size of 280 bytes, which is relatively small compared to, for example, the maximum packet size of approximately 1 kilobyte (1024 bytes) for ACL pipes. In some cases, transfer of multiple HCI commands may be batched to maximize link use. Typically, however, only a few HCI commands are sent to the peripheral (or host) controller at a time, and the responses of those commands influence what subsequent commands are sent. Moreover, given the responsiveness-oriented nature of HCI, optimizations such as command batching and waiting for transfer of commands may not be ideal in low-latency applications. Instead, the number of bus turnarounds required to deliver an HCI command to the peripheral (or host) side may be lowered (or raised, depending on the size of payload, type of interface, or other conditions) to optimize the timely transmission of commands and reception of responses.

In one exemplary embodiment of such an "optimized doorbell" approach, the doorbell for the HCI command transfer descriptor ring (TDR) conveys a head pointer (also known as a head index) and/or a tail pointer (also known as a tail index) that describes the TDR. In addition, each HCI command payload (i.e., the command itself) may be placed in the footer portion of the corresponding transfer descriptor (TD). While in typical scenarios, the footer portion is an optional component of the TD, in the present embodiment, the footer portion is useful for inserting the HCI command payload and transmitting it directly, e.g., from the peripheral processor to the host processor (or vice versa).

As noted above, a head index and/or a tail index may describe a TDR or a CDR. TDs reside inside a TDR, which resides in host memory and is accessible to the peripheral. A TDR is described by a TDR head index and a TDR tail index. The TDR head index is written by the host and read by the peripheral, and points to the next empty slot in the TDR. The TDR tail index is written by the peripheral and read by the host, and points to the next TD that the peripheral will process. CDs reside inside a CDR, which resides in host memory and is accessible to the peripheral. A CDR is described by a CDR head index and a CDR tail index. The CDR head index is written by the peripheral and read by the host. The CDR tail index is written by the host and read by the peripheral.

In a typical operation via an HCI interface, the head index would be stored in memory (e.g., external memory, e.g., DRAM 108A, 108B) by, e.g., a host processor. Thereafter, another processor, e.g., a peripheral processor, may need to perform a direct memory access (DMA) to retrieve the index.

When the doorbell itself conveys the head index, this eliminates one access to host memory (e.g., external memory separate from a host buffer) that would otherwise be necessary to fetch the index. In addition, each HCI command payload is placed in the corresponding TD footer, such that a receiving device (e.g., a peripheral processor) does not need to schedule an additional DMA operation to fetch the HCI command after having fetched the TD. In other words, the exemplary embodiment obviates the two-step fetching of the prior art.

Whereas a typical "doorbell" mechanism writes to a region of memory that "rings the bell" and notifies a device which retrieves the head pointer doorbell array (HPDA) that indicates that there is work to be done (e.g., retrieve data), various optimizations as described above obviate the need for such use of an array. For example, in the exemplary embodiment, the "doorbell" itself, i.e., data written to memory, contains the payload to be delivered to the device. In some variants, there may be multiple doorbells, and individual doorbells may be dedicated to a corresponding transfer ring and head index.

Moreover, the exemplary embodiment enables usage of a "virtual" TDR as noted elsewhere (with respect to FIG. 4), which has a head index and a tail index but no actual data stored in memory, such as an external memory module (e.g., DRAM 108A, 108B). The virtual TDR may reside in the host (or peripheral) memory buffer and be accessible by the peripheral (or host) processor. Each virtual TDR is described by a head index and a tail index, and may for example cause one or more CDs that have payload (e.g., HCI events) in their footers or headers to be queued for transfer without pointing to memory with the head and tail indices. That is, the host processor may indicate, via the virtual TDR (head index and tail index), to the peripheral processor to transfer a payload with an optional footer and/or header of a CD, and vice versa (e.g., the peripheral can receive transfers from the host via an optional footer and/or header of a TD).

HCI events (as opposed to HCI commands) may be generated in batches. More specifically, HCI comments may include commands such as those related to opening or closing of links, such as "Create_Connection" (event code 0x0005 that creates an ACL connection to the device) and "Disconnect" (event code 0x0006 that terminates an existing connection to a device). HCI event packets are generated as a result of an action by a Bluetooth device or by executing HCI commands on the device. One example would be "Data_Buffer_Overflow_Event" (event code 0x1A that indicates that the data buffers on the host has overflowed. Hence, there are more HCI events than there are HCI commands that are generated. In one exemplary embodiment, to accommodate HCI events in the exemplary interface, in addition to the optimizations used for HCI commands as described above, accumulation of data may be leveraged, and a maximum amount of time set for accumulating data.

For example, in one embodiment, an accumulation time, or a time limit, may be set by the host for the amount of the time the peripheral may accumulate data (e.g., HCI event packets) in its local memory before sending it to the host. In this case, the peripheral may maintain a timer for the accumulation. In one variant, the host may also specify an accumulation threshold, which specifies the maximum number of bytes of data the peripheral may accumulate before sending it over to the host. Using accumulation as described above may reduce the number of link transitions when multiple events are sent in rapid succession.

The above approaches serve to reduce the number of transmissions between independently operable host and peripheral processors, thereby improving power efficiency and lowering latency (i.e., greater responsiveness and speed) between a device that houses the processors and an external device (e.g., Bluetooth-enabled headphones). These approaches are particularly useful for low-power platforms such as, for example, Bluetooth implementations (including Bluetooth Low Energy (BTLE)).

Asynchronous Connection-Less (ACL)

In contrast to the HCI interface, ACL is a data-moving pipe that supports the maximum throughput supported by the Bluetooth protocol. Specifically, the maximum size for ACL data packets may reach approximately 1 kilobyte (1024 bytes). Advantageously, the maximum size may accommodate lower-throughput traffic as well, such as that of the Bluetooth Low Energy (BTLE) protocol. In other words, the ACL interface may be used for both high- or low-throughput transmissions (or a combination thereof).

When used for high throughput, the ACL pipes may carry packets in external buffers. In the exemplary embodiment, a doorbell optimization mechanism (i.e., the doorbell contains the payload, as described elsewhere) may be used with ACL pipes to eliminate one turnaround and DMA transaction. When used for low throughput, the ACL pipes may carry packets (e.g., payloads) in the optional footer portion of a TD when transmitting data from host to peripheral processor, or in the optional footer portion of a CD when transmitting data from peripheral to host processor in order to further reduce the bus overhead.

For example, when the direction of data is from the host to the peripheral processor, the doorbell itself (sent by the host) may convey the head index (written by the host processor) that describes the transfer descriptor ring (TDR). In various embodiments, the doorbell and/or the footer portion of corresponding TDs may contain the payload, as long as the payload fits. Fitting the payload in the footer may be appropriate in certain situations such as when a host is pushing small data packets (e.g., for BTLE). In this way, a costly transaction in which the TD is not fully utilized may be prevented. However, for moving data close to peak throughput (e.g., if packet sizes are large), the external buffer may be used with the optimized doorbell approach. In some embodiments, a device in communication with the peripheral processor (e.g., as packets are sent from host processor to peripheral processor to peripheral device) may need to first inspect every transaction via the ACL interface to determine whether data exists in the optional footer or in the external buffer. In one variant, if the device sees that no payload exists in the TD footer, then it may fetch the payload from the external buffer.

In another example, when the direction of data is from the peripheral to host processor, the doorbell also may convey the tail index (written by the peripheral processor) that describes the TDR. In various embodiments, the doorbell may contain the payload to be delivered from peripheral processor to host processor. Moreover, the payload may be placed in the footer portion of CDs. Furthermore, in other variants, accumulation of data may be leveraged in order to reduce the number of link transitions.

In some embodiments, a determination is made by the host processor or the peripheral processor (depending on the direction of the ACL traffic) as to whether the optional footer or the external buffer is best suited for delivery optimized for lower latency and lower cost or power usage. In some variants, a size threshold or range is determined. For example, the packet size may need to be between 256 to 1024 bytes (i.e., 256 bytes or above) for the external buffer to be utilized; otherwise, the footer is used based on the presumption that the payload will fit in the footer. In some variants, this threshold or range may be dynamic and automatically determined based on the amount of traffic or specific implementation (e.g., sending continuous data to a headset vs. receiving sporadic data from a mouse). In some variants, this threshold or range is predetermined and/or may be set manually.

These mechanics can introduce efficiencies that benefit (lower) the latency as well as response times by virtue of obviating the need for multiple fetching processes performed by prior implementations. With fewer transactions to achieve a unit of work, latency may be lowered and power potential or efficiency improved, which is particularly advantageous for inherently low-power protocols (e.g., Bluetooth).

In addition, in one or more embodiments, given ACL's tendency to transmit a large amount of data, a "doorbell moderation" mechanism may be used to prevent suboptimal link utilization that results from generating a doorbell for every update of an index (or an index array) by the host processor. Doorbell moderation may thus be useful with high throughputs. According to this mechanism, each TDR is associated with a moderation delay that specifies the maximum time the host processor may take before generating a doorbell for an index update. The host processor may further maintain one or more moderation timers associated with the moderation delay. The ring is also associated with a moderation threshold, which specifies the maximum number of bytes corresponding to the transfer descriptors (TDs) queued or completed for the ring after which the host may generate a doorbell. In this way, the doorbell moderation at the host processor may ensure that with each doorbell, a device may fetch multiple buffers in a batch.

Accordingly, the high throughput capacity of ACL data pipes may achieve low-latency transmissions via the use of footer portions of TDs or CDs in combination with external memory buffers.

Synchronous Connection-Oriented (SCO)

The SCO logical transport is configured to carry traffic very low data rate and/or periodic traffic. In one exemplary embodiment, optional footers of TDs and CDs may be used to transact over the SCO interface, given the low packet size of approximately 60 bytes. In one example, a doorbell initiated from a host processor may convey a head index that describes a TDR. This may be beneficial to low-traffic situations, and is in contrast to the typical method of depositing the head index in an external memory, thereby saving one transaction (e.g., via DMA from a peripheral processor or an external device). In addition, small payloads (of up to approximately 60 bytes) transported over SCO pipes may be placed within an optional footer component of a TD, thereby saving another transaction since there is no need to schedule a transaction to fetch the payload from, e.g., an external buffer as done in prior solutions.

In another example, a doorbell initiated from a peripheral-side processor may convey a tail index that describes the TDR (similar to the host-side example). In addition, payloads sent over SCO pipes may be placed within an optional footer component of a CD. As such, two transactions may be saved over prior solutions when delivering SCO payloads using this "virtual TR" approach.

In some embodiments, accumulation methods as described supra may be used. However, SCO packets tend to be transmitted one at a time. Hence, in other embodiments, accumulation methods may not be used. In some variants, to minimize overhead over the SCO interface, the optional footers of TDs and CDs may be used exclusively.

Debug Interface

In addition to the HCI, ACL and SCL interfaces, a debug interface may provide a high-bandwidth path between the peripheral controller and the host. In one exemplary embodiment, the debug interface may be used for, for example, buffered logging of IPC events on the peripheral side. Having a separate debug interface may decouple debug packets from application packets and enable prioritization of application data over debug. In one embodiment, the client service for the debug interface may be distinct from the Bluetooth stack. In some embodiments, the debug interface may be used to handle any errors detected within IPC transactions and recovered as described in co-owned U.S. patent application Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS" and filed Oct. 8, 2015, and co-owned U.S. patent application Ser. No. 14/870,923 entitled "METHODS AND APPARATUS FOR CONTROLLED RECOVERY OF ERROR INFORMATION BETWEEN INDEPENDENTLY OPERABLE PROCESSORS" filed Sep. 30, 2015, each of which was previously incorporated by reference supra.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method of transferring packets via an inter-processor communication (IPC) link between a first independently operable processor apparatus and a second independently operable processor apparatus, the method comprising:
   identifying a payload for transfer, the payload comprising one or more packets to be transmitted to the second independently operable processor apparatus;
   selecting one of a plurality of transmission modes based on a communication protocol of the second independently operable processor apparatus having one or more application constraints, the selected transmission mode to be used for the transfer to the second independently operable processor apparatus;
   for a first of the plurality of transmission modes, placing the payload in a location of a memory described by a data structure;
   for a second of the plurality of transmission modes, placing the payload within a designated portion of the data structure; and
   transmitting the data structure to the second independently operable processor apparatus via the IPC link.

2. The method of claim 1, wherein the placing of the payload within the designated portion of the data structure comprises placing the payload in a footer component or a header component of a transfer descriptor, the transfer descriptor representing an input/output (I/O) access.

3. The method of claim 2, wherein the placing of the payload in the location of the memory described by the data structure comprises placing the payload in a memory buffer location identified by the transfer descriptor.

4. The method of claim 1, wherein the selecting of the one of the plurality of transmission modes based on the communication protocol is based on a Bluetooth protocol or Bluetooth Low Energy (BTLE) protocol.

5. The method of claim 4, wherein the selecting is further based on the one or more application constraints of power, data latency, or data throughput.

6. The method of claim 1, wherein the transmitting of the data structure to the second independently operable processor apparatus does not require access to a memory that is external to the second independently operable processor apparatus.

7. The method of claim 1, wherein the selecting of the one of the plurality of transmission modes is based on one or more application constraints of a Host-Control Interface (HCI), an Asynchronous Connection-Less (ACL) interface, and a Synchronous Connection-Oriented (SCO) interface.

8. A device configured to enable data communication between a first and a second processor apparatus via an inter-processor communication (IPC) link, the device comprising:
 a first bus configured to transmit data between the first and second processor apparatus; and
 a non-transitory computer-readable apparatus comprising a storage medium having a computer program stored therein, the computer program comprising a plurality of instructions configured to, when executed by the first processor apparatus, cause the first processor apparatus to:
 identify a payload for transmission to the second processor apparatus;
 determine a communication protocol to be used by the second processor apparatus;
 determine whether a size of the payload exceeds a threshold;
  when the size of the payload exceeds the threshold, place the payload within an external memory module, and cause retrieval of the payload from the external memory module by the second processor apparatus; and
  when the size of the payload does not exceed the threshold, place the payload within a region of a data structure and transmit the data structure directly to the second processor apparatus via the first bus.

9. The device of claim 8, wherein:
 the device comprises a wireless-enabled device;
 the first processor apparatus comprises an application processor (AP);
 the second processor apparatus comprises a baseband (BB) processor, the BB processor being in data communication with a peripheral device; and
 the second processor apparatus is in data communication with an air interface associated with the peripheral device.

10. The device of claim 8, wherein the data structure comprises a transfer descriptor; and
 wherein the plurality of instructions are further configured to, when executed by the first processor apparatus, cause the first processor apparatus to:
  cause the second processor apparatus to receive the payload via the transmission of the transfer descriptor, the payload being contained in the region of the transfer descriptor, the region of the transfer descriptor comprising a footer component or a header component of the transfer descriptor; and
  receive a second data structure from the second processor apparatus, the second data structure comprising a completion descriptor, the completion descriptor being configured to indicate completion of the transmission of the transfer descriptor.

11. The device of claim 8, wherein the transmission of the data structure is configured to enable the communication protocol to transact a Host-Control Interface (HCI), an Asynchronous Connection-Less (ACL) interface, or a Synchronous Connection-Oriented (SCO) transaction.

12. The device of claim 8, wherein a size of the payload is at most 280 bytes.

13. The device of claim 8, wherein the communication protocol to be used by the second processor apparatus is characterized by one or more application constraints.

14. The device of claim 8, wherein the device further comprises a second bus; and
 the first bus and the second bus comprise a pair of unidirectional pipes, a first of the pair of unidirectional pipes being configured to transmit first data from the first processor apparatus to the second processor apparatus, a second of the pair of unidirectional pipes being configured to transmit second data from the second processor apparatus to the first processor apparatus.

15. The device of claim 8, wherein the communication protocol comprises Bluetooth or Bluetooth Low Energy (BTLE).

16. A non-transitory computer-readable apparatus comprising a storage medium having a computer program stored therein, the computer program comprising a plurality of instructions configured to, when executed by an processor apparatus, cause the processor apparatus to:
 identify a communication protocol to be used by another processor apparatus;
 determine a payload for transmission to the other processor apparatus, the processor apparatus and the other processor apparatus being in data communication via an inter-processor communication (IPC) link;
 place the payload inside a component of a data descriptor, the data descriptor describing a physically contiguous memory buffer associated with the processor apparatus; and
 transmit a doorbell message to the other processor apparatus, the doorbell message comprising an index of data structures, at least one of the index of data structures comprising the data descriptor;
 transact the data descriptor to the other processor apparatus, causing the other processor apparatus to receive the payload; and
 receive a second data descriptor indicating that the other processor apparatus has completed the transaction of the data descriptor.

17. The non-transitory computer-readable apparatus of claim 16, wherein:
 the processor apparatus comprises an applications processor (AP);
 the other processor apparatus comprises a baseband processor (BB);
 the BB is configured to be in data communication with an air interface associated with a modem configured to be in data communication with a peripheral device;
 the received payload is used by the modem to perform a data transaction with the peripheral device.

18. The non-transitory computer-readable apparatus of claim 16, wherein the data structure comprises a transfer descriptor ring.

19. The non-transitory computer-readable apparatus of claim 16, wherein the other processor apparatus operates via a Bluetooth protocol; and
 the plurality of instructions are further configured to, when executed by the processor apparatus, cause the processor apparatus to:
 generate an Asynchronous Connection-Less (ACL) payload for the other processor;
 determine whether a size of the ACL payload exceeds a threshold;
 when the size of the ACL payload exceeds the threshold, place the ACL payload within an external memory module, and cause retrieval of the ACL payload from the external memory module by the other processor apparatus; and when the size of the ACL payload does not exceed the threshold, place the ACL payload within the component of the data descriptor, and transmit the data structure directly to the other processor apparatus.

20. The non-transitory computer-readable apparatus of claim 16, wherein the other processor apparatus operates via a Bluetooth protocol; and the plurality of instructions are further configured to, when executed by the processor apparatus, cause the processor apparatus to generate an Synchronous Connection Oriented (SCO) payload for the other processor.

* * * * *